United States Patent
Kubota

(10) Patent No.: US 8,818,372 B2
(45) Date of Patent: Aug. 26, 2014

(54) BASE STATION CONTROL MODULE, WIRELESS BASE STATION, BASE STATION CONTROL DEVICE, AND BASE STATION CONTROL METHOD

(75) Inventor: Mitsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 557 days.

(21) Appl. No.: 12/997,317

(22) PCT Filed: Apr. 17, 2009

(86) PCT No.: PCT/JP2009/057790
§ 371 (c)(1),
(2), (4) Date: Dec. 10, 2010

(87) PCT Pub. No.: WO2009/154038
PCT Pub. Date: Dec. 23, 2009

(65) Prior Publication Data
US 2011/0092212 A1    Apr. 21, 2011

(30) Foreign Application Priority Data

Jun. 16, 2008 (JP) ................................. 2008-156681

(51) Int. Cl.
*H04W 36/18* (2009.01)
*H04W 36/08* (2009.01)

(52) U.S. Cl.
USPC .......................................... 455/436; 455/522

(58) Field of Classification Search
USPC ................................. 455/436, 522
See application file for complete search history.

(56) References Cited

U.S. PATENT DOCUMENTS

| 6,721,564 | B1 * | 4/2004 | Kobayashi | 455/436 |
| 7,499,701 | B2 * | 3/2009 | Salonaho et al. | 455/423 |
| 2002/0061757 | A1 * | 5/2002 | Hunzinger | 455/458 |
| 2006/0281462 | A1 * | 12/2006 | Kim et al. | 455/436 |
| 2009/0215400 | A1 * | 8/2009 | Chang et al. | 455/67.14 |
| 2011/0009116 | A1 * | 1/2011 | Moberg et al. | 455/425 |

FOREIGN PATENT DOCUMENTS

| CN | 1170323 A | 1/1998 |
| CN | 101075844 A | 11/2007 |
| CN | 101150829 A | 3/2008 |

(Continued)

OTHER PUBLICATIONS

International Search Report for PCT/JP2009/057790 mailed Jul. 21, 2009.
Chinese Office Action for CN Application No. 200980122769.8 dated on Mar. 5, 2013 with English Translation.

*Primary Examiner* — Marcos Batista
*Assistant Examiner* — Frank Donado
(74) *Attorney, Agent, or Firm* — Sughrue Mion, PLLC

(57) ABSTRACT

A wireless base station that solves a problem in which both the suppression of a power consumption of a wireless base station and the reduction of the period that a mobile terminal takes to identify a cell cannot be satisfied at a time is provided. Determination section 101 determines whether or not a mobile terminal is present in a cell that wireless base station 10a manages. If determination section 101 determines that a mobile terminal is present, control section 102 sets wireless base station 10a for a first transmission repetition as a transmission repetition of a pilot signal; if determination section 101 determines that no mobile terminal is present, control section 102 sets wireless base station 10a for a second transmission repetition lower than the first transmission repetition as a transmission repetition of the pilot signal.

8 Claims, 16 Drawing Sheets

(56) References Cited

FOREIGN PATENT DOCUMENTS

| JP | 9-327060 A | 12/1997 |
| JP | 11-511930 A | 10/1999 |
| JP | 2003259424 A | 9/2003 |
| JP | 2008066780 A | 3/2008 |
| WO | 01/13546 A1 | 2/2001 |
| WO | 2007046261 A | 4/2007 |

* cited by examiner

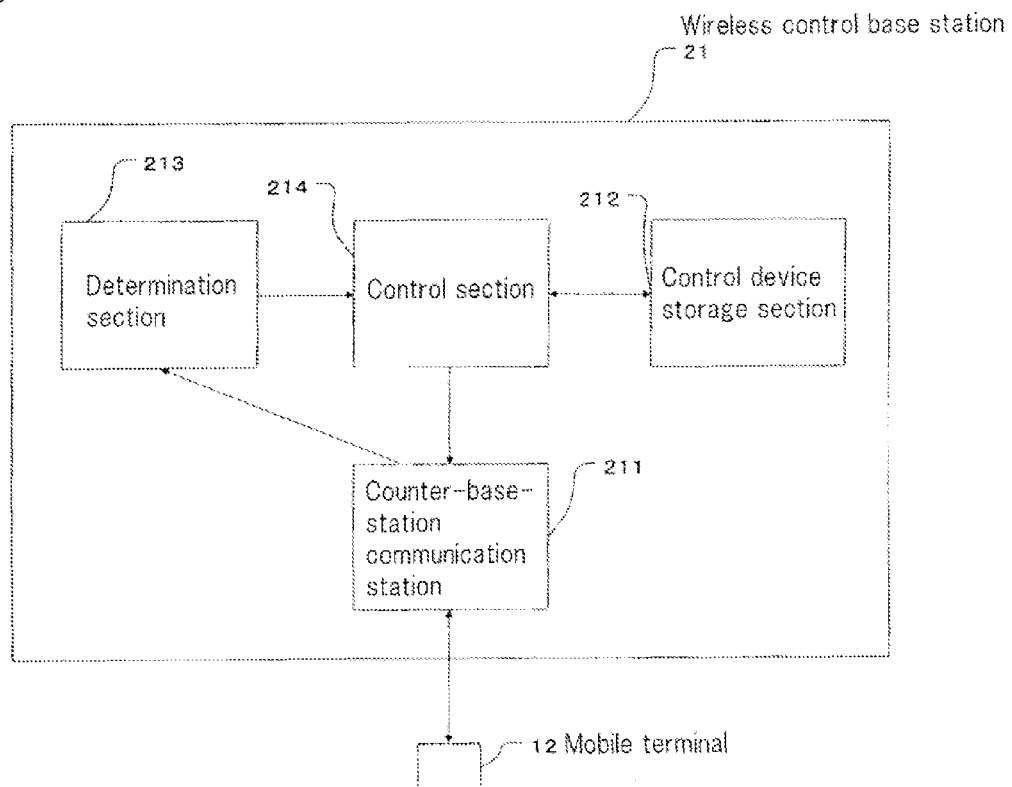

BASE STATION CONTROL MODULE, WIRELESS BASE STATION, BASE STATION CONTROL DEVICE, AND BASE STATION CONTROL METHOD

The present application is the National Phase of PCT/JP2009/057790, filed Apr. 17, 2009, which claims priority based on Japanese Patent Application JP 2008-156681 filed on Jun. 16, 2008, the entire contents of which are incorporated herein by reference in its entirety.

TECHNICAL FIELD

The present invention relates to a base station control module, a wireless base station, a base station control device, and a base station control method, in particular, to a base station control module, a wireless base station, a base station control device, and a base station control method that can intermittently transmit a pilot signal.

BACKGROUND ART

In recent years, LTE (Long Term Evolution) system has been proposed as a cellular system. The LTE system uses SC-FDMA (Single Carrier-Frequency Division Multiple Access) system as a wireless access system in the uplink direction, and OFDMA (Orthogonal Frequency-Division Multiple Access) system as a wireless access system in the downlink direction.

The OFDMA system is a digital modulation/demodulation system in which radio resources are divided into a plurality of frequency bands using the orthogonality of frequencies, data are multiplexed with carriers having divided frequency bands (referred to as subcarriers), and the resultant signals are transmitted. The OFDMA system is alleged to have tolerance against fading and multi-path interference.

In contrast, although the SC-FDMA system is similar to the OFDMA system, the former is different from the latter in the following points. In the OFDMA system, divided frequency bands are allocated to individual users, whereas in the SC-FDMA system the radio resources are divided into frequency bands and time components and the divided radio resources are allocated to individual users. Moreover, in the SC-FDMA system, the frequency bands allocated to the users are longer than those in the OFDMA system. Thus, the SC-FDMA system is expected to improve power efficiency in comparison with the OFDMA system.

In addition, a wireless base station in the LTE system transmits a pilot signal that includes cell identification information that identifies a cell that its base station manages. A mobile terminal receives the pilot signal so as to identify a cell in which its terminal is present and performs a handover. The handover means that a mobile terminal switches from one base station to another base station through which the mobile terminal communicates.

FIG. 1 is a sequence diagram describing the operation of a cellular system in the state that a handover is performed. Hereinafter, a wireless base station that manages a cell in which a mobile terminal has been moved is referred to as a moving source wireless base station, whereas a wireless base station that manages a cell to which the mobile terminal has been moved is referred to as a moving target wireless base station.

Step 0: The moving source wireless base station stores context information of mobile terminals present in the cell of its base station (UE context). The context information includes roaming restriction information that is information with respect to wireless base stations that mobile terminals cannot access. The roaming restriction information is provided from a mobile terminal to the moving source wireless base station when an RRC connection is established between the mobile terminal and the moving source wireless base station or a timing advance is updated. The timing advance is information with which transmission timing of an uplink signal transmitted from a mobile terminal is controlled.

Step 1: The moving source wireless base station selects cells to measure the received signal strength (RSSI: Received Signal Strength Indication) using the context information stored at step 0. The moving source wireless base station transmits measurement control information (Measurement Control), that causes the received signal strengths of the selected cells to be measured, to the mobile terminal.

Step 2: When the mobile terminal receives the measurement control information, the mobile terminal measures the received signal strength of each of the selected cells. Specifically, the mobile terminal receives pilot signals from wireless base stations that manage the selected cells and measures the received signal strength of each of the cells based on the pilot signals. When the received signal strength becomes equal to or greater than a predetermined threshold, the mobile terminal transmits to the moving source wireless base station a measurement report that denotes that the received signal strength indication becomes equal to or greater than threshold target.

Step 3: When the moving source wireless base station receives the measurement report, the moving source wireless base station starts performing a handover process.

Step 4: The moving source wireless base station transmits to the moving target wireless base station a handover request message that causes a handover to be performed.

The handover request message includes information with respect to X2 interface, information with respect to S1 interface, information with respect to SAE (System Architecture Evolution) bearer, and information that represents settings of RRC. The X2 interface is an interface that mutually connects wireless base stations, whereas the S1 interface is an interface that mutually connects a wireless base station and an EPC (Enhanced Packet Core). On the other hand, the information with respect to the SAE bearer includes Qos information.

The moving target wireless base station extracts a transport layer address of the moving source wireless base station from the information with respect to the X2 interface. In addition, the moving target wireless base station extracts a transport layer address of the EPC from the information with respect to the S1 interface.

Step 5: The moving target wireless base station performs an admission control that admits a mobile terminal using the Qos information included in the handover request message. In addition, the moving target wireless base station reserves a C-RNTI (Cell Radio Network Temporary Identifier) and a dedicated random access preamble and decides a validation period for the dedicated random access preamble. Moreover, the moving target wireless base station generates a transparent container.

Step 6: The moving target wireless base station transmits an acknowledge reply, that acknowledges the handover request message (Handover Request Acknowledge), to the moving source wireless base station. The transparent container transmitted to the mobile terminal is included in the acknowledge reply.

Step 7: When the moving source wireless base station receives the acknowledge reply, the moving source wireless base station transmits a handover command, that causes the handover to be performed (RRC Handover Command), to the mobile terminal. The handover command includes the transparent container transmitted from the moving target wireless base station.

Step 8: When the mobile terminal receives the handover command, the mobile terminal synchronizes with the moving target wireless base station on the basis of each radio frame. When the mobile terminal has been assigned a dedicated random access preamble, the mobile terminal executes a non-contention based random access procedure. In contrast, when the mobile terminal has not assigned a dedicated random access preamble (for example, when the moving target wireless base station has used all dedicated random access preambles), the mobile terminal executes a contention based random access procedure.

Step 9: The moving target wireless base station transmits token frame Ta that prevents mobile terminals from interfering on UL (Up Link)-SCH (Synchronization Channel) by a RACH (Random Access Channel). In addition, the moving target wireless base station informs the mobile terminal of the allocated UL-SCH resources.

Step 10: When the mobile terminal receives the allocated UL-SCH resources, the mobile terminal transmits confirmation information that confirms a handover (Handover Confirm) to the moving target wireless base station using the UL-SCH resources. The moving target wireless base station collates C-RNTI included in the confirmation information and C-RNTI transmitted to the moving source wireless base station at step 6. Thus, the moving target wireless base station confirms that a handover of the mobile terminal, to which the resources have been allocated, has been completed. At this point, the moving target wireless base station starts transmitting data to the mobile terminal.

Step 11: The moving target wireless base station transmits a path switch message to an MME (Mobility Management Entity) to inform it that the mobile terminal has moved to another cell.

Step 12: When the MME receives the path switch message, the MME transmits a user plane update request message to an S-GW (Server Gateway).

Step 13: When the S-GW receives the user plane update request, the S-GW switches the path of the down link to the moving target wireless base station. Thereafter, the S-GW releases the U-Plane/TNL resources with respect to the moving source wireless base station.

Step 14: The S-GW transmits a reply to the user plane update request (User Plane Update Response) message to the MME.

Step 15: When the MME receives the reply message, the MME transmits a path switch acknowledge reply (Path Switch Ack) message to the moving target wireless base station.

Step 16: When the moving target wireless base station receives the path switch acknowledge reply message, the moving target wireless base station transmits a release request that causes resources to be released (Release Resource) to the moving source wireless base station to inform the moving source wireless base station that a handover has been successfully performed.

Step 17: When the moving source wireless base station receives the release request, the moving source wireless base station releases the resources. Now, the handover has been completed.

At present, the LTE system is continuously transmitting pilot signals. The continuous transmission of the pilot signals does not mean that the pilot signals are perfectly continuously transmitted, but means that the pilot signals are transmitted at very large transmission repetitions. Hereinafter, the continuous transmission is referred to as a regular transmission.

When the pilot signals are regularly transmitted, since the transmission power of the pilot signals increases, the power consumption of the wireless base stations also increases. This leads to a large cost factor in the operation of the cellular system. Thus, it has been desired to accomplish a technology that suppresses the transmission power of the pilot signals and that suppresses the power consumption of the wireless base stations.

Patent Document 1 describes a pilot channel transmission method that can suppress the transmission power of pilot signals. In this pilot channel transmission method, the pilot signals are intermittently transmitted. The repetition rates at which pilot signals are intermittently transmitted are lower than those at which they are regularly transmitted. Hereinafter, transmission that is intermittently performed is referred to as the intermittent transmission.

FIG. 2 is a descriptive diagram showing the transmission power of a pilot signal and the power consumption of a wireless base station in each regular transmission state and intermittent transmission state.

Transmission power 1 represents the chronological change of the transmission power of a pilot signal in the continuous transmission state, whereas transmission power 2 represents the chronological change of the transmission power of a pilot signal in the intermittent transmission state. On the other hand, power consumption 3 represents the chronological change of the power consumption of a wireless base station in the continuous transmission state, whereas power consumption 4 represents the chronological change of the power consumption of the wireless base station in the intermittent transmission state.

Transmission power 1 is always a large value since the pilot signal is continuously transmitted. Transmission power 2 is a large value for a transmission period in which the pilot signal is transmitted since the pilot signal is intermittently transmitted, however, transmission power 2 becomes zero at the transmission intervals of the pilot signal. Thus, the integral value of transmission power 2 is smaller than that of transmission power 1. Thus, the integral value of power consumption 4 is smaller than that of power consumption 3. Note that since the wireless base station does not stop its operation at the transmission intervals of the pilot signal, power consumption 4 does not become zero even at the transmission intervals.

PRIOR ART DOCUMENT

Patent document 1: JP9-327060A

SUMMARY OF THE INVENTION

Subject that the Invention is to Solve

When a pilot signal is intermittently transmitted, since the transmission intervals for which the pilot signal is not transmitted become long, the period in which a mobile terminal cannot receive the pilot signal becomes long. Thus, the period in which the mobile terminal identifies a cell increases.

On the other hand, when a pilot signal is continuously transmitted, although the period that the mobile terminal takes to identify the cell can be shortened, as described above, since the transmission power of the pilot signal becomes large, the power consumption of the wireless base station becomes large.

Thus, there is a problem in which both the suppression of the power consumption of a wireless base station and the reduction of the period that a mobile terminal takes to identify a cell cannot be satisfied at the same time.

An object of the present invention is to provide a base station control module, a wireless base station, a wireless base station control device, and a base station control method that can solve the problem in which both the suppression of the power consumption of a wireless base station and the reduction of the period that a mobile terminal takes to identify a cell cannot be satisfied at the same time as the above-mentioned problem.

Means for Solving the Problem

A base station control module according to the present invention is a base station control module that controls a wireless base station that transmits an own cell pilot signal, includes determination means that periodically determines whether or not a mobile terminal is present in an own cell that said wireless base station manages; and control means that sets said wireless base station for a first transmission repetition as a transmission repetition at which said own cell pilot signal is transmitted to said wireless base station if said determination means determines that said mobile terminal is present and that sets said wireless base station for a second transmission repetition that is lower than said first transmission repetition as said transmission repetition if said determination means determines that said mobile terminal is not present.

On the other hand, a wireless base station according to the present invention includes the above-described base station control module, and transmission means that transmits said own cell pilot signal at a transmission repetition that has been set by said control means.

On the other hand, a wireless base station control device according to the present invention includes the above-described base station control module.

On the other hand, a base station control method according to the present invention is a base station control method that controls a wireless base station that transmits an own cell pilot signal, includes periodically determining whether or not a mobile terminal is present in an own cell that said wireless base station manages; and setting said wireless base station for a first transmission repetition as a transmission repetition at which said own cell pilot signal is transmitted to said wireless base station if determined that said mobile terminal is present and setting said wireless base station for a second transmission repetition that is lower than said first transmission repetition as said transmission repetition if determined that said mobile terminal is not present.

Effect of the Invention

According to the present invention, both the suppression of the power consumption of a wireless base station and the reduction of the period that a mobile terminal takes to identify a cell can be satisfied at the same time.

BRIEF DESCRIPTION OF THE DRAWINGS

FIG. 22 is a block diagram showing an example of the structure of a wireless control device.

FIG. 23 is a descriptive diagram showing another example of the mode change request.

FIG. 24 is a descriptive diagram showing another example of the mode change completion report.

EMBODIMENTS FOR CARRYING OUT THE INVENTION

Next, embodiments of the present invention will be described with reference to drawings.

Figure 3:
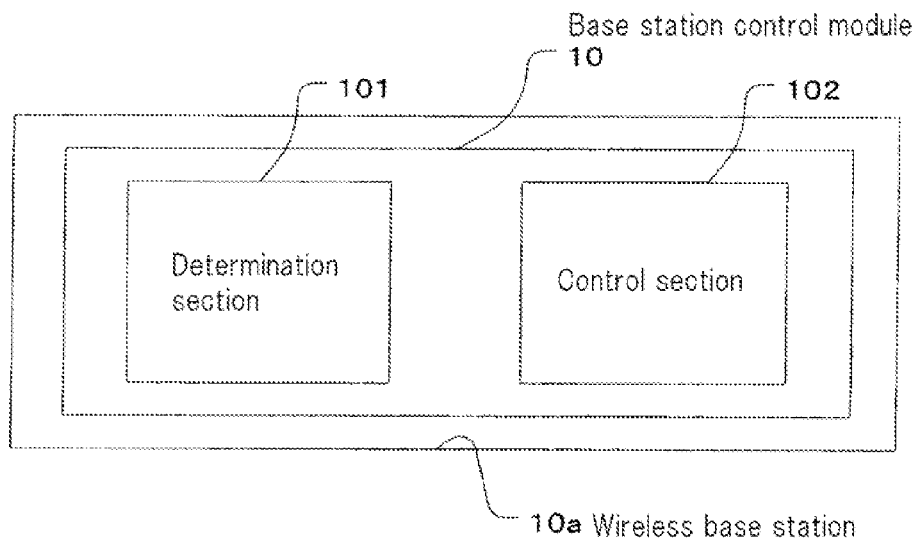
FIG. 3 is a block diagram showing the structure of a base station control module according to a first embodiment of the present invention.

FIG. 3 is a block diagram showing the structure of a base station control module according to a first embodiment of the present invention. In FIG. 3, base station control module 10 includes determination section 101 and control section 102. Base station control module 10 is included in wireless base station 10a that transmits a pilot signal and controls wireless base station 10a. A pilot signal that wireless base station 10a transmits is an example of an own cell pilot signal.

Determination section 101 determines whether or not a mobile terminal is present in a cell that wireless base station 10a manages. For example, when wireless base station 10a receives an uplink signal from a mobile terminal, determination section 101 determines that a mobile terminal is present in the cell. In contrast, when wireless base station 10a does not receive an uplink signal in a predetermined time period, determination section 101 determines that no mobile terminal is present in the cell.

If determination section 101 determines that a mobile terminal is present, control section 102 sets wireless base station 10a for a first transmission repetition as the transmission repetition at which a pilot signal is transmitted. In contrast, if determination section 101 determines that no mobile terminal is present, control section 102 sets wireless base station 10a for a second transmission repetition that is lower than the first transmission repetition as the transmission repetition.

Wireless base station 10a transmits the pilot signal at the transmission repetition that has been set.

Next, the operation will be described.

Figure 4:
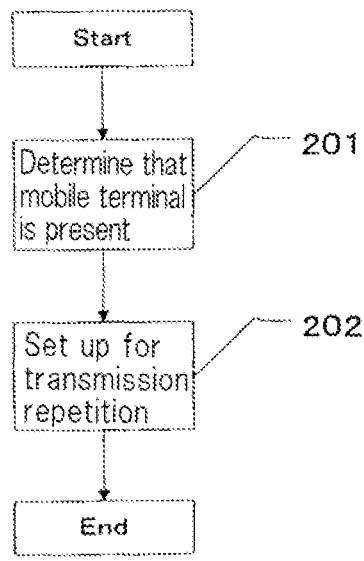
FIG. 4 is a flowchart describing an example of the operation of a base station control module.

FIG. 4 is a flowchart describing an example of the operation of base station control module 10.

First of all, determination section 101 periodically determines whether or not a mobile terminal is present in the cell that wireless base station 10a manages. For example, determination section 101 checks whether or not wireless base station 10a has received an up link signal from a mobile terminal in a predetermined time period. If wireless base station 10a receives the uplink signal, determination section 101 determines that a mobile terminal is present in the cell; if wireless base station 10a does not receive the uplink signal, determination section 101 determines that no mobile terminal is present in the cell (at step 201).

Thereafter, determination section 101 transmits an internal report that represents the determined result to control section 102. When control section 102 receives the internal report and if the internal report denotes that a mobile terminal is present, control section 102 sets wireless base station 10a for the first transmission repetition as the transmission repetition of the pilot signal. In contrast, if the internal report denotes that no mobile terminal is present, control section 102 sets wireless base station 10a for the second transmission repetition as the transmission repetition of the pilot signal (at step 202).

Next, the effect will be described.

In this embodiment, determination section 101 determines whether or not a mobile terminal is present in the cell that wireless base station 10a manages. If determination section 101 has determined that a mobile terminal is present, control section 102 sets wireless base station 10a for the first transmission repetition as the transmission repetition of the pilot signal; if determination section 101 determines that no mobile terminal is present, control section 102 sets wireless base station 10a for the second transmission repetition that is lower than the first transmission repetition as the transmission repetition of the pilot signal.

In this case, if a mobile terminal is present in the cell of wireless base station 10a, the rate of transmission repetitions of the pilot signal becomes high; if no mobile terminal is present in the cell of the wireless base station 10a, the rate of transmission repetition of the pilot signal becomes low. Thus, the higher the rate of transmission repetition is, the higher the power consumption of wireless base station 10a becomes. As a result, when no mobile terminal is present in the cell of wireless base station 10a, the power consumption of wireless base station 10a can be suppressed. In contrast, if a mobile terminal is present in the cell of wireless base station 10a, since the pilot signal is transmitted to the mobile terminal at a high repetition rate, the period that the mobile terminal takes to identify the cell can be shortened. Consequently, both the suppression of the power consumption of a wireless base station and the period that a mobile terminal takes to identify a cell can be satisfied at a time.

Next, a second embodiment will be described.

In this embodiment, as operation modes, a base station has a regular mode in which the base station transmits a pilot signal at a first transmission repetition and a power save mode in which the base station transmits the pilot signal at a second transmission repetition.

Figure 5:
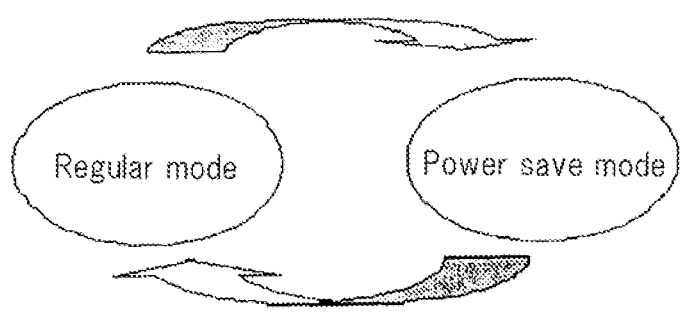
FIG. 5 is a descriptive diagram showing the situation of a wireless base station that changes the operation mode.

FIG. 5 is a descriptive diagram showing the situation of a base station that changes the operation mode according to this embodiment. As shown in FIG. 5, when the regular mode has been set as the operation mode, if no mobile terminal is present in its cell, the operation mode is changed from the regular mode to the power save mode. In contrast, when the power save mode has been set as the operation mode, if a mobile terminal that is communicating is present in its own cell or before a mobile terminal performs a handover, the operation mode is changed from the power save mode to the regular mode.

Next, this embodiment will be described in detail.

Figure 6:
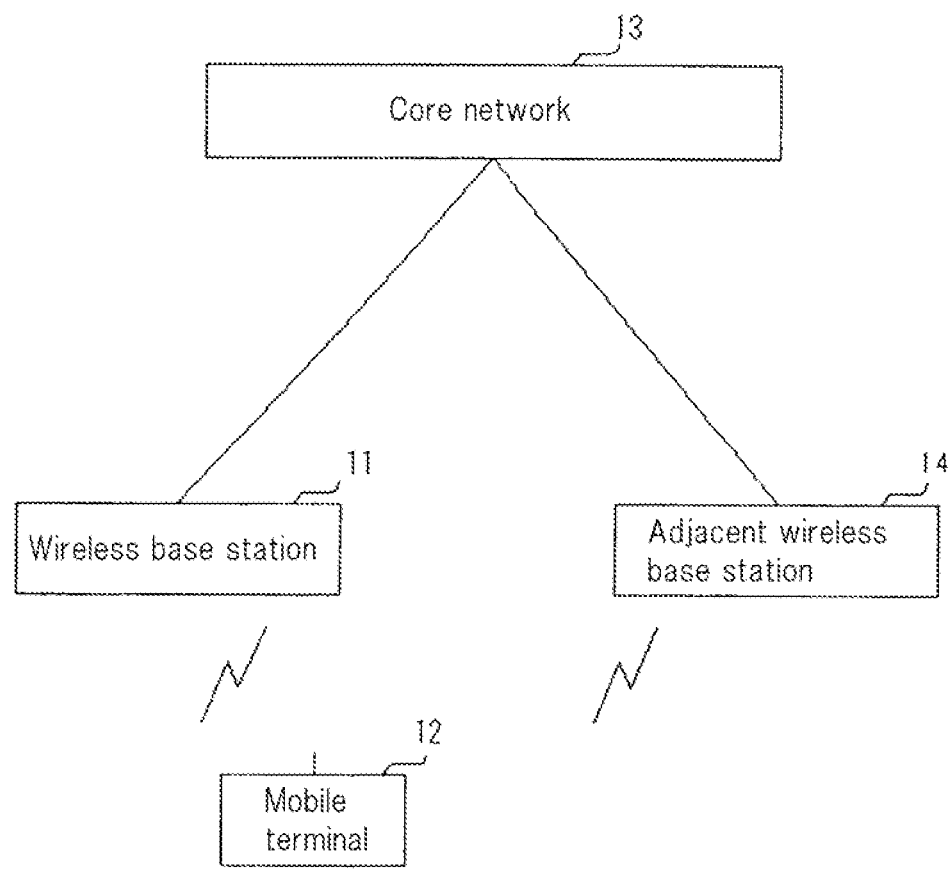
FIG. 6 is a block diagram showing a cellular system according to a second embodiment of the present invention.

FIG. 6 is a block diagram showing a cellular system according to this embodiment. In this embodiment, an LTE system is applied as the cellular system.

In FIG. 6, the cellular system includes wireless base station 11 and mobile terminal 12. Wireless base station 11 and mobile terminal 12 can wirelessly communicate with each other. In addition, wireless base station 11 and adjacent wireless base station 14 can communicate with each other through core network 13. A cell that wireless base station 11 manages adjoins a cell that adjacent wireless base station 14 manages. Hereinafter, the cell that wireless base station 11 manages is referred to as the own cell, whereas the cell that adjacent wireless base station 14 manages is referred to as the adjacent cell.

Figure 7:
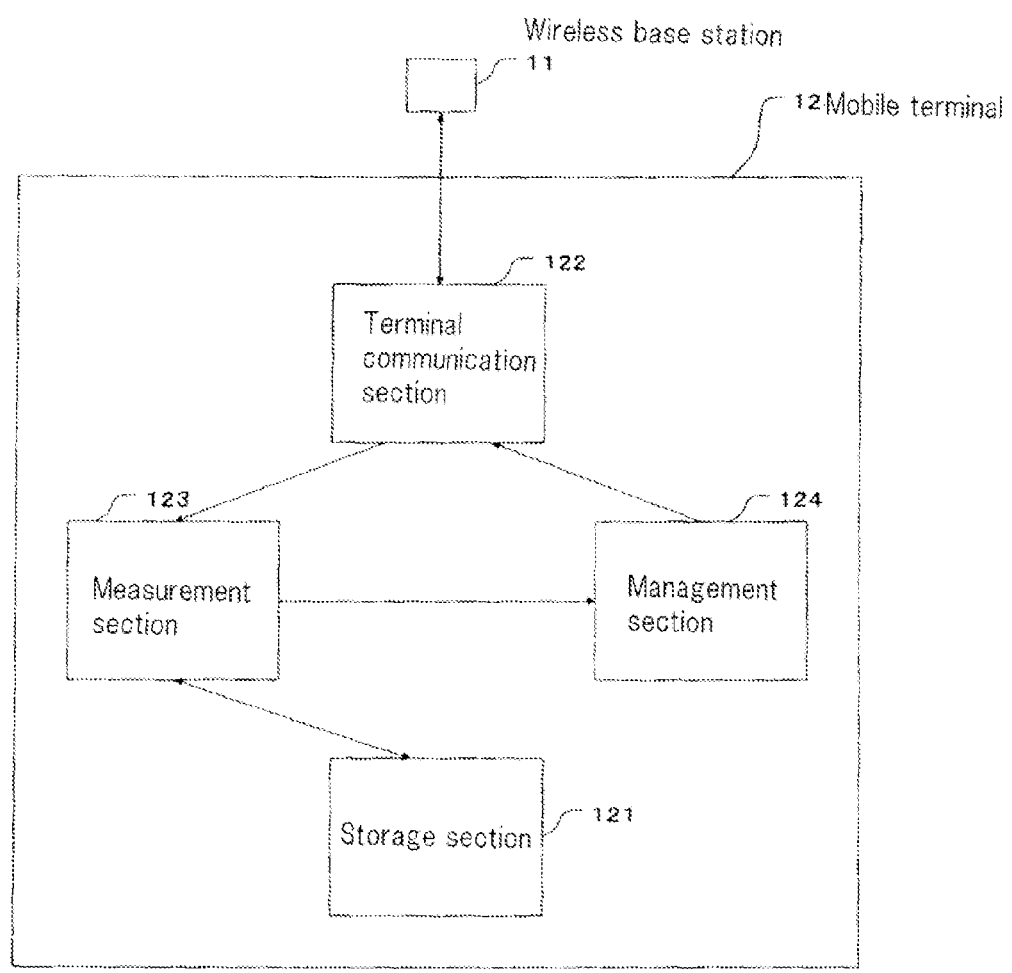
FIG. 7 is a block diagram showing the structure of a mobile terminal according to the second embodiment of the present invention.

FIG. 7 is a block diagram showing an example of the structure of mobile terminal 12. In FIG. 7, mobile terminal 12 includes storage section 121, terminal communication section 122, measurement section 123, and management section 124.

Storage section 121 stores cell identification information that identifies its own cell that communicating wireless base station 11 manages.

Terminal communication section 122 receives respective pilot signals that wireless base station 11 and adjacent wireless base station 14 have transmitted. A pilot signal includes cell identification information that identifies a cell of a wireless base station that has transmitted the pilot signal.

If cell identification information in a pilot signal is different from that stored in storage section 121, measurement section 123 determines that the pilot signal is the adjacent pilot signal that has been transmitted from adjacent wireless base station 14. In contrast, if cell identification information in a pilot signal is identical to that stored in storage section 121, measurement section 123 determines that the pilot signal is its pilot signal that has been transmitted from wireless base station 11. Its pilot signal is an example of an own cell pilot signal.

In addition, measurement section 123 measures the received signal strengths of the adjacent pilot signal and the own pilot signal.

Measurement section 123 determines whether or not the received signal strength of the adjacent pilot signal is equal to or greater than predetermined threshold a_target. In addition, measurement section 123 determines whether or not the received signal strength of the adjacent pilot signal is equal to or greater than predetermined threshold b_target. Moreover, measurement section 123 determines whether or not the received signal strength of its own pilot signal is equal to or lower than predetermined threshold c_source.

Threshold b_target is lower than threshold a_target. Threshold a_target is an example of a first threshold, whereas threshold b_target is an example of a second threshold. On the other hand, threshold c_source is an example of a third threshold.

If measurement section 123 determines that the received signal strength of the adjacent pilot signal is equal to or greater than threshold a_target, management section 124 transmits measurement report above_a, that denotes that the received signal strength of the adjacent pilot becomes equal to or greater than threshold a_target, to wireless base station 11. Measurement report above_a is an example of a first measurement report. In addition, measurement report above_a includes cell identification information in the adjacent pilot signal whose received signal strength becomes equal to or greater than threshold a_target.

In addition, if measurement section 123 determines that the received signal strength of the adjacent pilot signal is equal to or greater than threshold b_target, management section 124 transmits measurement report above_b that denotes that the received signal strength of the adjacent pilot becomes equal to or greater than threshold b_target to wireless base station 11. Measurement report above_b is an example of a second measurement report. In addition, measurement report above_b includes cell identification information in the adjacent pilot signal whose received signal strength becomes equal to or greater than threshold b_target.

Moreover, if measurement section 123 determines that the received signal strength of the own pilot signal is equal to or lower than threshold c_source, management section 124 transmits measurement report below_c, that denotes that the received signal strength of the own pilot signal becomes equal to or lower than threshold c_source, to wireless base station 11. On the other hand, measurement report below_c is an example of a third measurement report.

Figure 1:
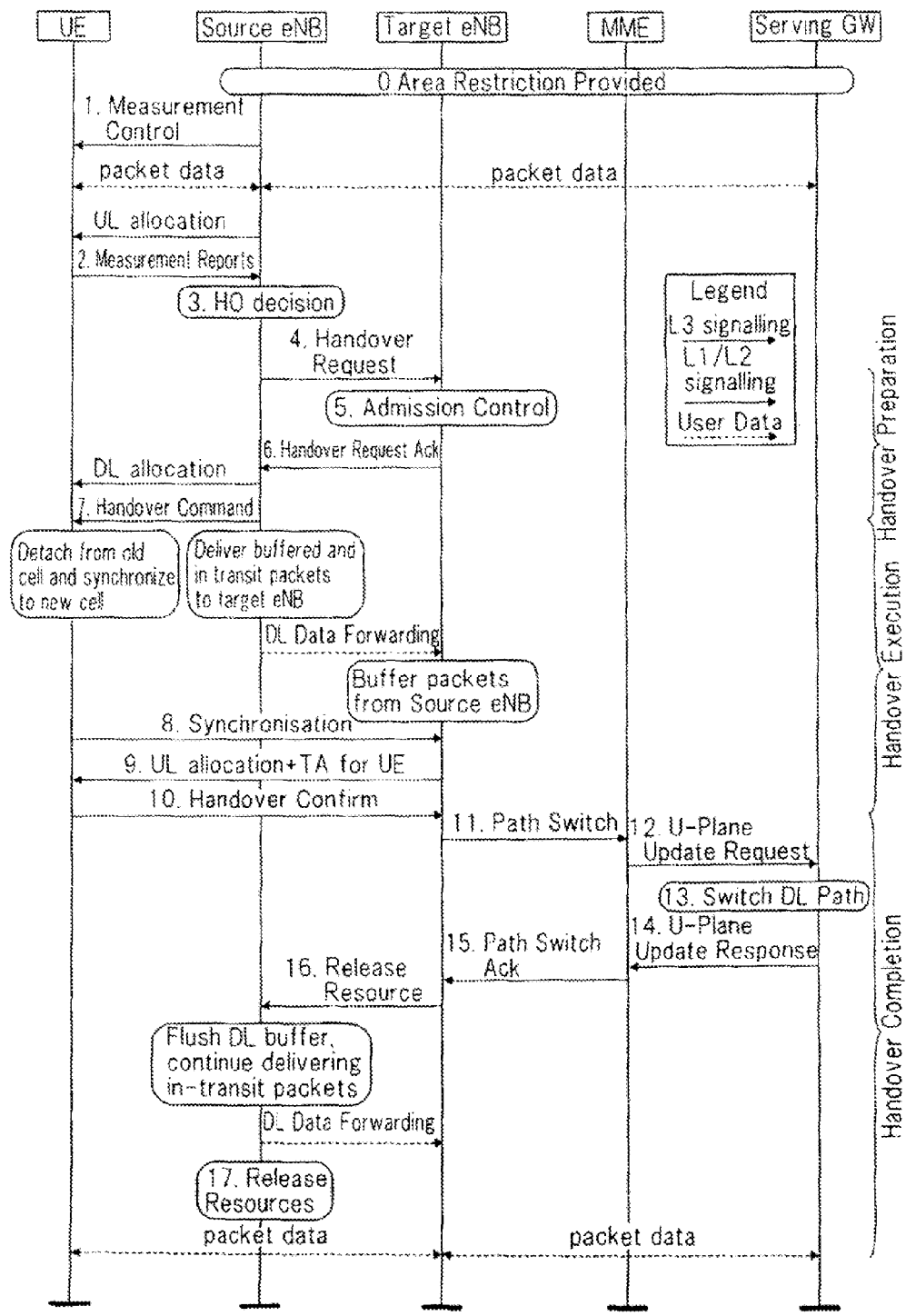
FIG. 1 is a sequence diagram describing the operation of a cellular system in the state in which a handover is performed.
Figure 2:
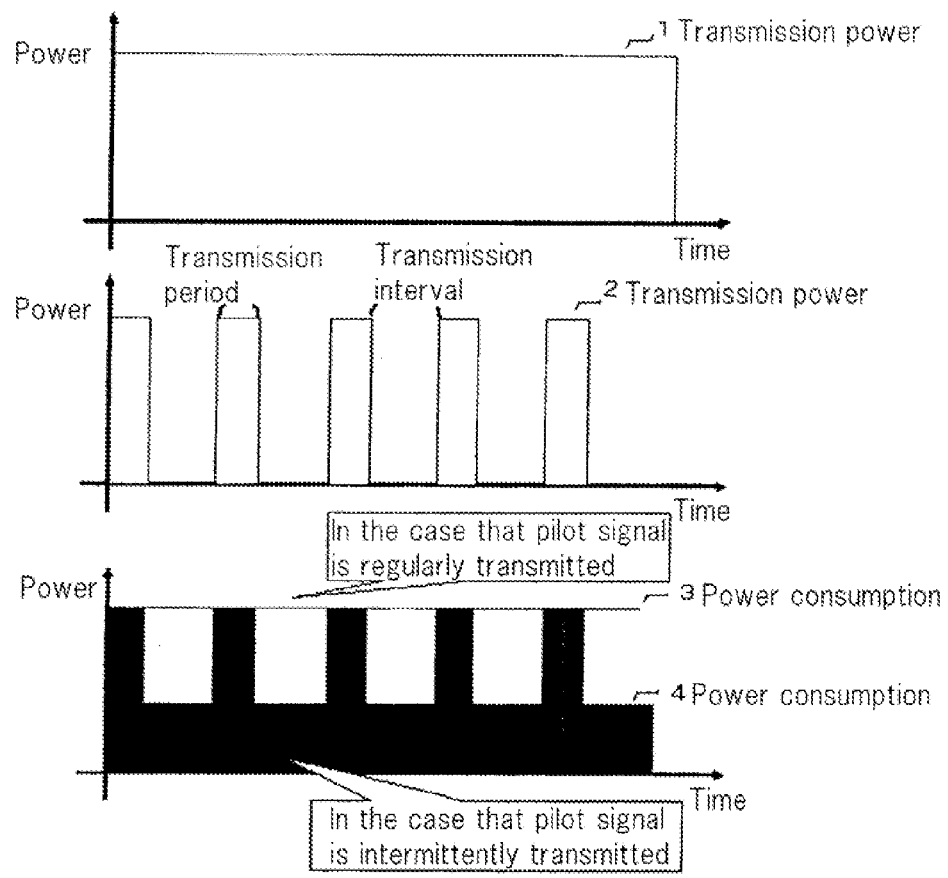
FIG. 2 is a descriptive diagram showing the transmission power of a pilot signal and the power consumption of a wireless base station
Figures 8, 9, 10:
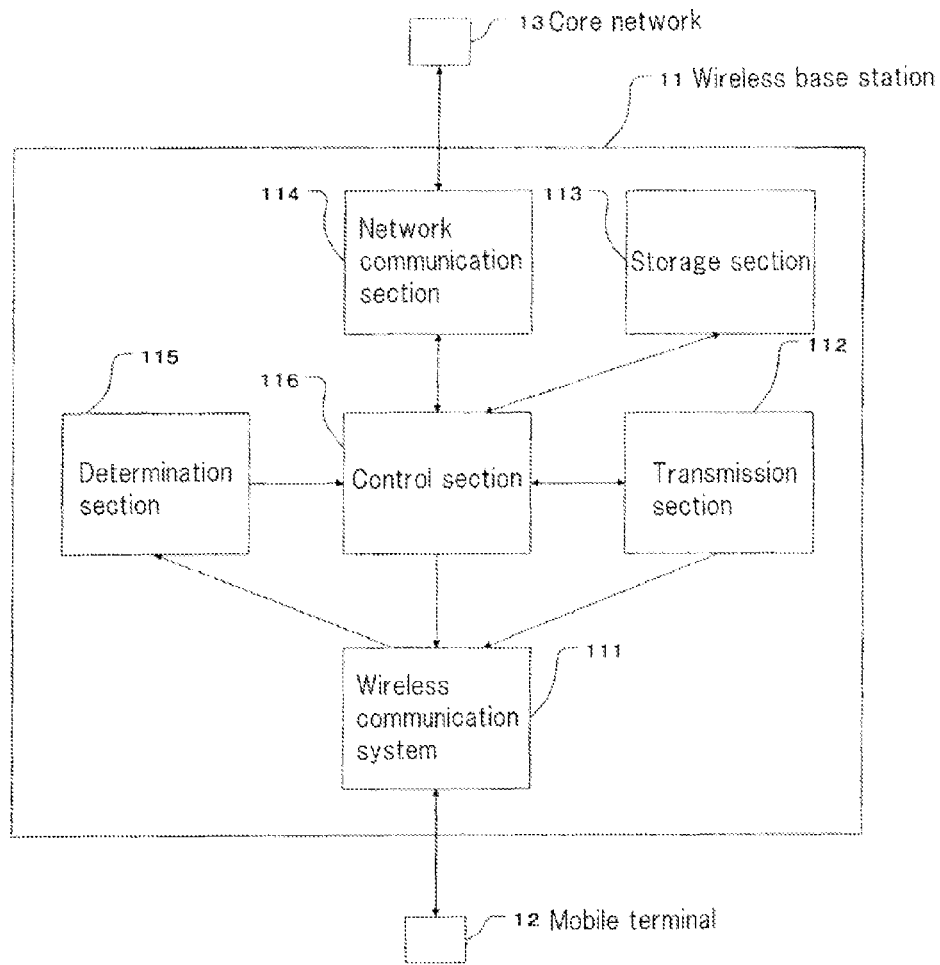
FIG. 8 is a block diagram showing the structure of a wireless base station according to the second embodiment of the present invention.
FIG. 9 is a descriptive diagram showing an example of a mode change request.
FIG. 10 is a descriptive diagram showing an example of a mode change completion report.

FIG. 8 is a block diagram showing an example of the structure of wireless base station 11. In FIG. 8, sections having the same functions as those shown in FIG. 1 are denoted by identical reference numerals and their description may be omitted.

In FIG. 8, wireless base station 11 includes wireless communication section 111, transmission section 112, storage section 113, network communication section 114, determination section 115, and control section 116. Wireless communication section 111, storage section 113, determination section 115, and control section 116 comprise a base station control module that controls wireless base station 11.

Wireless communication section 111 is an example of a communication means. Wireless communication section 111 receives measurement reports above_a, above_b, and below_c from a mobile terminal that is present in its own cell.

Transmission section 112 is set for either the regular mode or the power save mode as the operation mode. If transmission section 112 has been set for the regular mode, transmission section 112 transmits a pilot signal at the first transmission repetition; if transmission section 112 has been set for the power save mode, transmission section 112 transmits a pilot signal at the second transmission repetition.

Storage section 113 stores an adjacent cell list and own cell information. In the adjacent cell list, the addresses of adjacent wireless base stations 14 adjoining the own base station are correlated with individual pieces of cell identification information that identifies cells that adjacent wireless base stations 14 manage. The own cell information includes the address of its own base station and cell identification information that identifies its own cell.

Network communication section 114 receives from adjacent wireless base stations 14 a mode change request that causes the operation mode to be set for the regular mode and a mode change completion report that denotes that the operation mode corresponding to the mode change request has been set. The mode change request is used as an example of a repetition change request that causes the rate of repetitions at which a pilot signal is transmitted to be set for a first transmission repetition.

Determination section 115 determines whether or not a mobile terminal is present in the own cell.

Control section 116 controls the respective rate of transmission repetitions of the pilot signals at which wireless base station 11 and adjacent wireless base stations 14 transmit. Specifically, control section 116 performs the following process.

When wireless communication section 111 receives measurement report above_a, control section 116 causes mobile terminal 12 to perform a handover to adjacent wireless base station 14 that manages a cell identified by cell identification information in measurement report above_a.

In contrast, when wireless communication section 111 receives measurement report above_b, control section 116 transmits the mode change request to adjacent wireless base station 14 that manages a cell identified by cell identification information in measurement report above_b.

FIG. 9 is a descriptive diagram showing an example of the mode change request. In FIG. 9, mode change request 301 includes moving target wireless base station address 302, moving target cell ID 303, moving source wireless base station address 304, moving source cell ID 305, and mode change request information 306. The moving target wireless base station is adjacent wireless base station 14 that is the transmission target of the mode change request, whereas the moving source wireless base station is wireless base station 11 that is the transmission source of the mode change request. On the other hand, the moving target cell is a cell that the moving target wireless base station manages, whereas the moving source cell is a cell that the moving source wireless base station manages.

Moving target wireless base station address 302 is base station identification information that identifies a moving target wireless base station. Moving target cell ID 303 is cell identification information that identifies a moving target cell. Moving source wireless base station address 304 is base station identification information that identifies a moving source wireless base station. Moving source cell ID 305 is cell identification information that identifies a moving source cell. Mode change request information 306 denotes that this information (mode change request) is a mode change request.

The description will be returned to FIG. 8. When wireless communication section 111 receives measurement report below_c, control section 116 transmits the mode change request to all adjacent wireless base stations 14.

When network communication section 114 receives the mode change request, control section 116 sets transmission section 112 for the regular mode as the operation mode and starts up a timer. Thereafter, control section 116 transmits the mode change completion report to adjacent wireless base station 14 that has transmitted the mode change request.

FIG. 10 is a descriptive diagram showing an example of the mode change completion report. In FIG. 10, mode change completion report 401 includes moving target wireless base station address 402, moving target cell ID 403, moving source wireless base station address 404, moving source cell ID 405, mode change completion report information 406, and mode change result information 407.

Moving target wireless base station address 402 is base station identification information that identifies a moving target wireless base station. Moving target cell ID 403 is cell identification information that identifies a moving target cell. Moving source wireless base station address 404 is base station identification information that identifies a moving source wireless base station. Moving source cell ID 405 is cell identification information that identifies a moving source cell. Mode change completion report information 406 denotes that this information (mode change completion report) is a mode change completion report. Mode change result information 407 denotes whether or not the operation mode has been successfully changed.

The description will be returned to FIG. 8. When network communication section 114 receives the mode change completion report, control section 116 completes a process that sets adjacent wireless base station 14 for the operation mode. If the mode change result information in the mode change completion report denotes that the operation mode has not been successfully changed, control section 116 may re-transmit the mode change request.

In addition, if determination section 115 determines that a mobile terminal is present, control section 116 sets transmission section 112 for the regular mode. Moreover, if determination section 115 determines that no mobile terminal is present, control section 116 sets transmission section 112 for the power save mode. However, even if determination section 115 determines that no mobile terminal is present before the timer times out, control section 116 does not set transmission section 112 for the power save mode.

The time period after the timer starts up until it times out is decided based on a time period for which the mobile terminal needs to perform a handover. For example, the predetermined time period need to be longer than that for which the mobile terminal performs a handover.

Next, the operation will be described.

Figure 11:
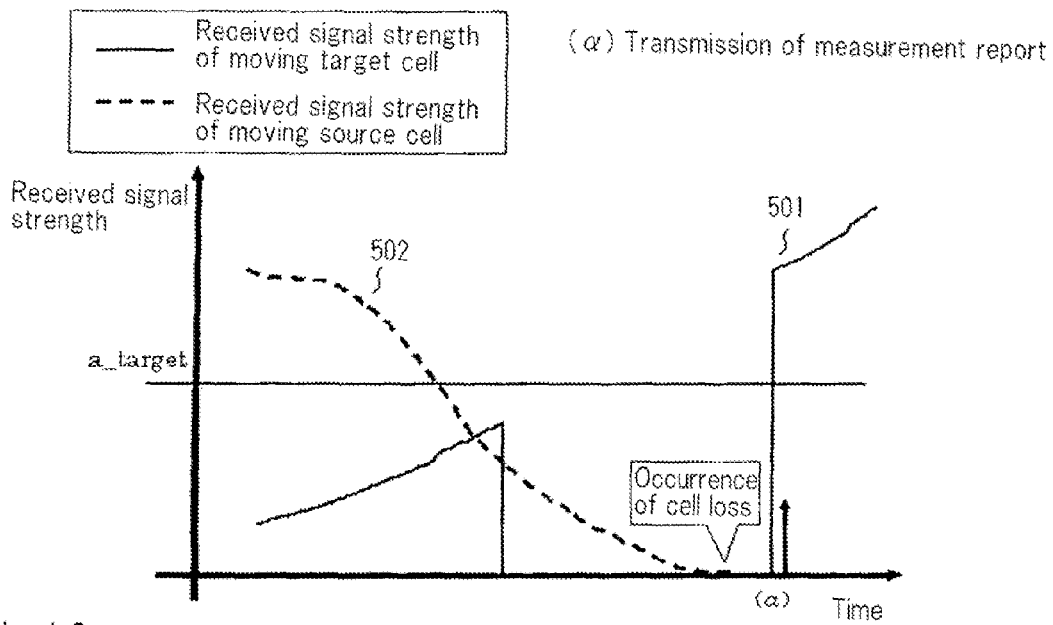
FIG. 11 is a descriptive diagram describing a situation in which a call drop takes place.

When a pilot signal is intermittently transmitted without thresholds b_target and c_source as in the prior art, before a mobile terminal performs a handover, a call drop may take place. FIG. 11 is a descriptive diagram describing a situation in which a call drop takes place. In FIG. 11, the horizontal axis represents time, whereas the vertical axis represents received signal strength.

In FIG. 11, since an adjacent pilot signal is intermittently transmitted, an intermittent period for which received signal strength 501 of an adjacent pilot signal becomes zero occurs.

In FIG. 11, in an intermittent period before time a at which received signal strength 501 becomes equal to or greater than threshold target, received signal strength 502 of the own pilot signal becomes 0 or nearly 0. In this situation, a call drop takes place before the first measurement report is transmitted. Thus, a handover may fail.

In this embodiment, since the following process is performed, a call drop can be suppressed. In addition, it is assumed that adjacent wireless base station 14 has been set the power save mode. Moreover, a case in which the received signal strength of the own pilot signal gradually falls and a case that the received signal strength sharply falls will be separately described.

Figure 12:
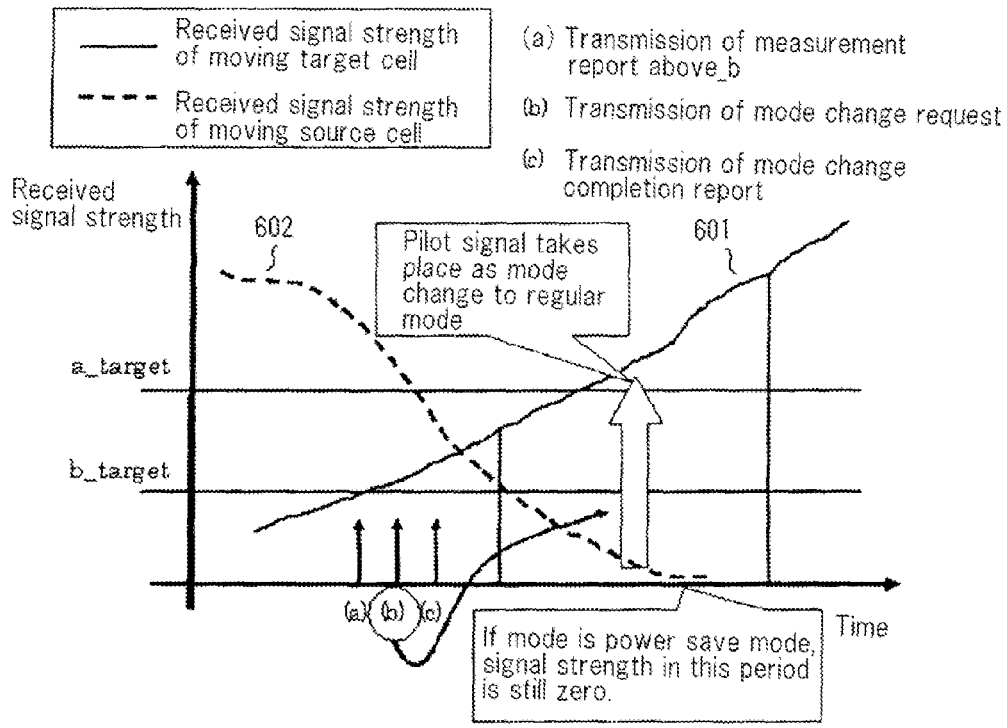
FIG. 12 is a descriptive diagram describing an example of the operation of an LTE system according to the second embodiment.

First, the case in which the received signal strength of the own pilot signal gradually falls will be described. FIG. 12 is a descriptive diagram describing an example of the operation of the LTE system according to this embodiment. In FIG. 12, the horizontal axis represents time, whereas the vertical axis represents received signal strength.

In this case, mobile terminal 12 can identify a moving target wireless base station using cell identification information in an adjacent pilot signal before the received signal strength of the own pilot signal becomes zero or nearly zero.

Specifically, assuming that received signal strength 601 of an adjacent pilot signal becomes equal to or greater than threshold b_target at time a, mobile terminal 12 transmits measurement report above_b to wireless base station 11. As described above, since threshold b_target is lower than threshold a_target, before mobile terminal 12 transmits measurement report above_a, namely before mobile terminal 12 starts performing the handover process, mobile terminal 12 transmits measurement report above_b.

Wireless base station 11 receives measurement report above_b and transmits the mode change request to an adjacent wireless base station as a moving target wireless base station corresponding to the cell identification information in measurement report above_b at time b.

Thereafter, adjacent wireless base station 14 as a moving target wireless base station receives the mode change request and sets its base station for the regular mode at time c. Thereafter, adjacent wireless base station 14 transmits the mode change completion report.

Thus, before the handover process is started up, the rate of repetition at which adjacent wireless base station 14 that becomes a moving target wireless base station and that transmits an adjacent pilot signal becomes high. As a result, before a call lost takes place, since a handover can be performed, the call drop can be suppressed from taking place.

Figure 13:
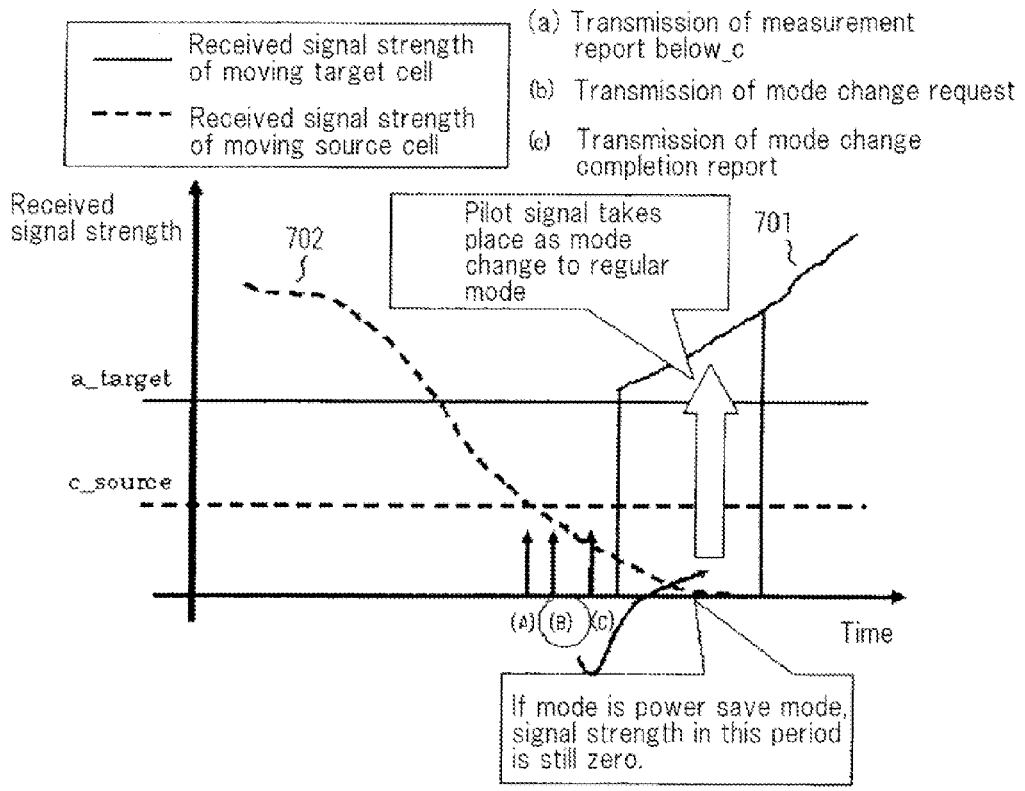
FIG. 13 is a descriptive diagram describing another example of the operation of the LTE system according to the second embodiment.

Next, the case in which the received signal strength of the own pilot signal sharply falls will be described. FIG. 13 is a descriptive diagram describing an example of the operation of the LTE system in this case according to this embodiment. In FIG. 13, the horizontal axis represents time, whereas the vertical axis represents received signal strength.

It is assumed that the received signal strength of the own pilot signal sharply falls in an intermittent period of an adjacent pilot signal. In this case, since adjacent pilot signals cannot be received, a moving target wireless base station cannot be identified from adjacent wireless base stations 14. Thus, the mode change request is transmitted to all adjacent wireless base stations 14.

Specifically, assuming that when received signal strength 701 of an adjacent pilot signal is zero at time A, received signal strength 702 of the own pilot signal becomes equal to or lower than threshold c_source, mobile terminal 12 transmits measurement report below_c to wireless base station 11. In addition, it is assumed that threshold c_source is greater than zero. These assumptions are made such that mobile terminal 12 can transmit measurement report below_c before a call drop takes place.

Wireless base station 11 receives measurement report below_c and transmits the mode change request to all adjacent wireless base stations 14 at time B.

Each of adjacent wireless base stations 14 receives the mode change request and sets the own base station for the regular mode at time C. Thereafter, each of adjacent wireless base stations 14 transmits the mode change completion report.

Thus, before the handover process is started up, the rates of transmission repetitions of the adjacent pilot signals by all adjacent wireless base stations 14 become high. As a result, before a call drop takes place, since a handover can be performed, the call drop can be suppressed from taking place.

Next, the operation of the LTE system will be described in detail.

Figure 14:
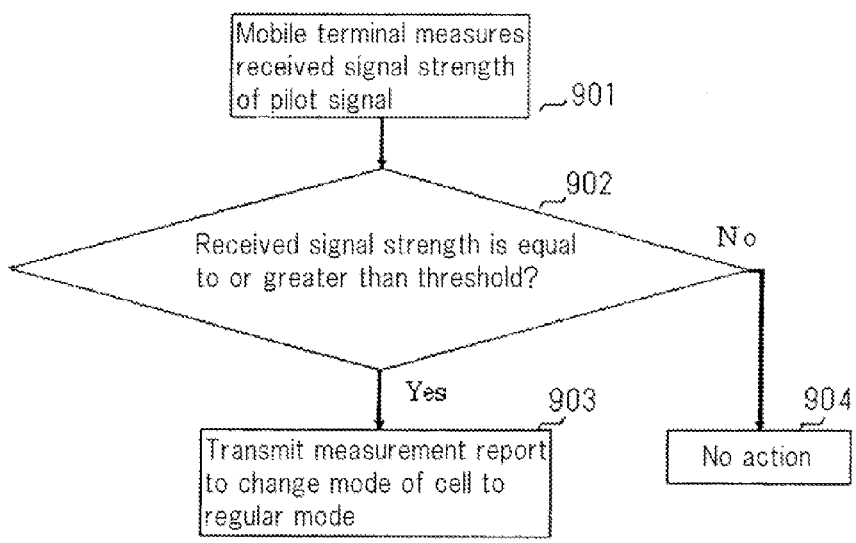
FIG. 14 is a flowchart describing an example of the operation of a mobile terminal in the state in which it receives an adjacent pilot signal.

First of all, the operation of mobile terminal 12 in the state in which it receives an adjacent pilot signal will be described. FIG. 14 is a flowchart describing an example of the operation of mobile terminal 12 in this state.

First, when terminal communication section 122 of mobile terminal 12 receives a pilot signal, terminal communication section 122 transmits the pilot signal to measurement section 123. When measurement section 123 receives the pilot signal, measurement section 123 measures the received signal strength of the pilot signal (at step 901).

Thereafter, measurement section 123 determines whether or not cell identification information in the pilot signal is identical to that stored in storage section 121. Since the pilot signal is an adjacent pilot signal, measurement section 123 determines that these two pieces of the cell identification information are different and identifies that the pilot signal is an adjacent pilot signal. Thereafter, measurement section 123 determines whether or not the measured received signal strength is equal to or greater than threshold b_target (at step 902).

If the received signal strength is equal to or greater than threshold b_target (Yes at step 902), measurement section 123 transmits information, that denotes that the received signal strength is equal to or greater than threshold b_target and cell identification information in the adjacent pilot signal, to management section 124.

When management section 124 receives such information and the cell identification information, management section 124 generates measurement report above_b including the cell identification information. Management section 124 transmits generated measurement report above_b to wireless base station 11 through terminal communication section 122 (at step 903).

In contrast, if the received signal strength is lower than threshold b_target (No at step 902), measurement section 123 completes the process (at step 904).

Figure 15:
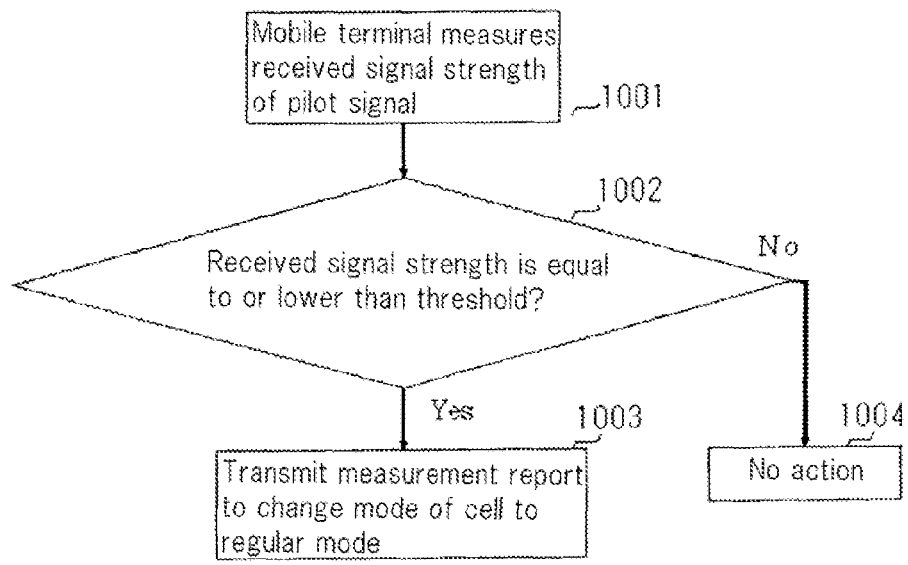
FIG. 15 is a flowchart describing an example of the operation of a mobile terminal in the state in which it receives a pilot signal.

Next, the operation of mobile terminal 12 in the state in which it receives its own pilot signal will be described. FIG. 15 is a flowchart describing an example of the operation of mobile terminal 12 in this state.

First of all, when terminal communication section 122 of mobile terminal 12 receives a pilot signal, terminal communication section 122 transmits the pilot signal to measurement section 123. When measurement section 123 receives the pilot signal, measurement section 123 measures the received signal strength of the pilot signal (at step 1001).

Thereafter, measurement section 123 determines whether or not cell identification information in the pilot signal is identical to that stored in storage section 121. Since the pilot signal is its own pilot signal, measurement section 123 determines that these pieces of the cell identification information are identical and identifies that the pilot signal is an own pilot signal. Thereafter, measurement section 123 determines whether or not the measured received signal strength is equal to or lower than threshold c_source (at step 1002).

If the received signal strength is equal to or lower than threshold c_source (Yes at step 1002), measurement section 123 transmits information that denotes that the received signal strength is equal to or lower than threshold c_source to management section 124.

When management section 124 receives such information, management section 124 generates measurement report below_c. Management section 124 transmits generated measurement report below_c to wireless base station 11 through terminal communication section 122 (at step 1003).

In contrast, if the received signal strength is equal to or greater than threshold c_source (No at step 1002), measurement section 123 completes the process (at step 1004).

Figure 16:
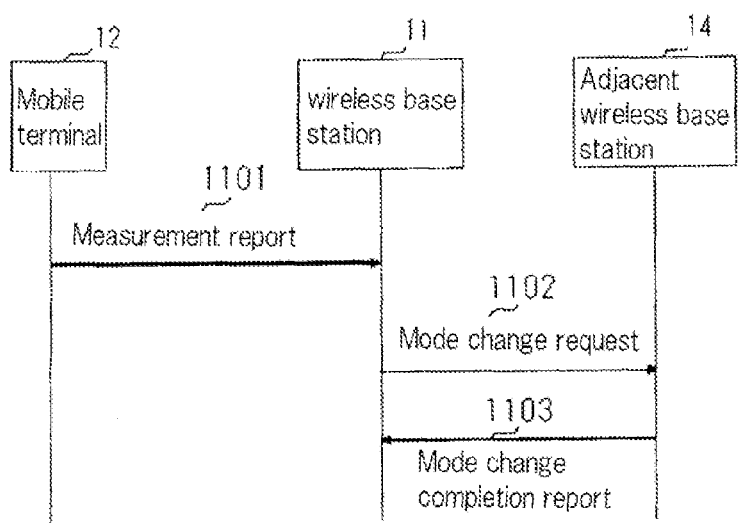
FIG. 16 is a sequence diagram describing an example of the operation of a wireless base station and adjacent wireless base stations in the state in which the wireless base station receives measurement report above_b.

Next, the operation of wireless base station 11 and adjacent wireless base station 14 in the state in which wireless base station 11 receives measurement report above_b will be described. FIG. 16 is a sequence diagram describing an example of the operation in this state.

When wireless communication section 111 of wireless base station 11 receives measurement report above_b, wireless communication section 111 transmits measurement report above_b to control section 116 (at step 1101).

When control section 116 receives measurement report above_b, control section 116 obtains the address of adjacent wireless base station 14 corresponding to cell identification information in measurement report above_b and the own cell information from storage section 113. Control section 116 generates a mode change request including the cell identification information, the address, and the own cell information. Control section 116 transmits the mode change request to adjacent wireless base station 14 identified by the address through network communication section 114 and core network 13 (at step 1102).

When network communication section 114 of adjacent wireless base station 14 receives the mode change request, network communication section 114 transmits the mode change request to control section 116. When control section 116 receives the mode change request, control section 116 sets transmission section 112 for the regular mode. For example, if transmission section 112 has been set for the power save mode, control section 116 changes the power save mode to the regular mode; if transmission section 112 has been set for the regular mode, control section 116 does not change the operation mode, but keeps the regular mode.

Thereafter, control section 116 generates a mode change completion report and transmits the mode change completion report to wireless base station 11 through network communication section 114 and core network 13. When network communication section 114 of wireless base station 11 receives the mode change completion report, network communication section 114 transmits the mode change completion report to control section 116. When control section 116 receives the mode change completion report, control section 116 completes the process (at step 1103).

Figure 17:
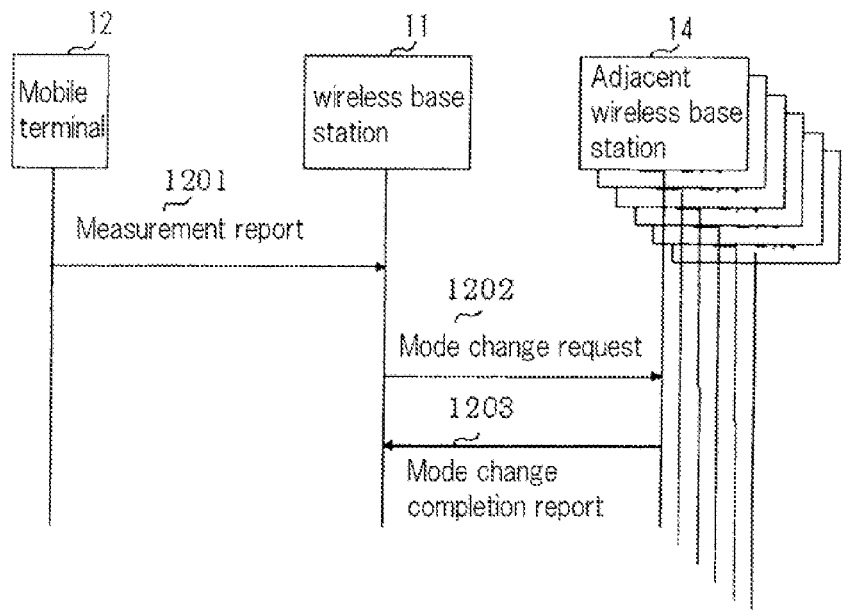
FIG. 17 is a sequence diagram describing an example of the operation of the wireless base station and the adjacent wireless base stations in the state in which the wireless base station receives measurement report below_c.

Next, the operation of wireless base station 11 and adjacent wireless base station 14 in the state in which wireless base station 11 receives measurement report below_c will be described. FIG. 17 is a schematic diagram describing an example of the operation in this state.

When wireless communication section 111 of wireless base station 11 receives measurement report below_c, wireless communication section 111 transmits measurement report below_c to control section 116 (at step 1201).

When control section 116 receives measurement report below_c, control section 116 obtains an adjacent cell list and own cell information from storage section 113. Control section 116 generates mode change requests including cell identification information, the address corresponding thereto and own cell information based on each piece of cell identification information of the adjacent cell list. Control section 116 transmits the individual mode change requests to adjacent wireless base stations 14 identified by the addresses in the mode change requests through network communication section 114 and core network 13 (at step 1202).

When network communication section 114 of adjacent wireless base station 14 receives a mode change request, network communication section 114 transmits the mode change request to control section 116. When control section 116 receives the mode change request, control section 116 sets transmission section 112 for the regular mode. For example, if transmission section 112 has been set for the power save mode, control section 116 changes the power save mode to the regular mode; if transmission section 112 has been set for the regular mode, control section 116 does not change the operation mode, but keeps the regular mode.

Thereafter, control section 116 generates a mode change completion report and transmits the mode change completion report to wireless base station 11 through network communication section 114 and core network 13. When network communication section 114 of wireless base station 11 receives the mode change completion report, network communication section 114 transmits the mode change completion report to control section 116. When control section 116 receives the mode change completion report, control section 116 completes the process (at step 1203).

Figure 18:
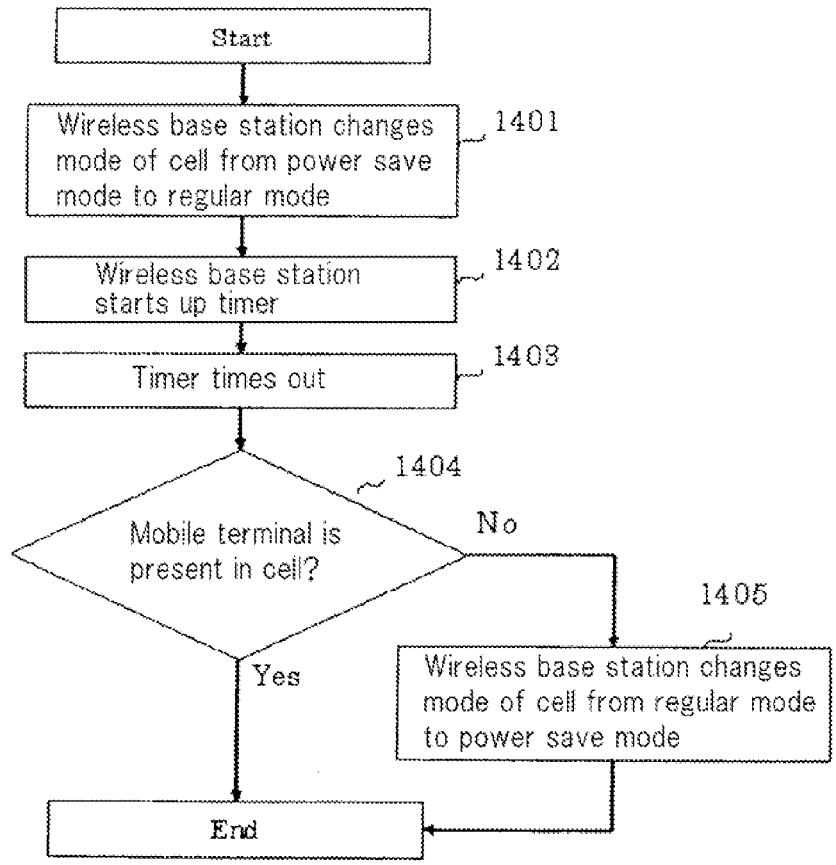
FIG. 18 is a flowchart describing an example of the operation of a wireless base station that is changed from a regular mode to a power save mode.

Next, operation of wireless base station 11 that changes the regular mode to the power save mode will be described. FIG. 18 is a flowchart describing an example of this operation.

When control section 116 of wireless base station 11 changes the operation mode to the regular mode at step 1102 shown in FIG. 16 or at step 1203 shown in FIG. 17, control section 116 starts up a timer (at step 1402).

After a predetermined time period elapses, the timer of control section 116 times out (at step 1403). When the timer times out, control section 116 transmits an operation command to determination section 115 When determination section 115 receives the operation command, determination section 115 determines whether or not a mobile terminal is present in the own cell (at step 1404).

If no mobile terminal is present in the own cell (No at step 1404), determination section 115 generates an internal report that denotes that no mobile terminal is present in the own cell and informs control section 116 of the internal report. When control section 116 receives the internal report, control section 116 changes the operation mode that has been set in transmission section 112 from the regular mode to the power save mode (at step 1405) and completes the process.

In contrast, if a mobile terminal is present in the own cell (Yes at step 1404), determination section 115 does not transmit the internal report, but completes the process.

Next, the effect will be described.

In this embodiment, wireless communication section 111 receives measurement report above_a that denotes that the received signal strength of an adjacent pilot signal that adjacent wireless base station 14 has transmitted becomes equal to or greater than threshold a_target and measurement report above_b that denotes that the received signal strength of an adjacent pilot signal becomes equal to or greater than threshold b_target that is lower than threshold a_target. When wireless communication section 111 receives measurement report above_a, control section 116 causes mobile terminal 12 to perform a handover to adjacent wireless base station 14. In contrast, when wireless communication section 111 receives measurement report above_b, control section 116 transmits a mode change request that causes the operation mode to be set for the regular mode to adjacent wireless base station 14. The mode change request is used as an example of a repetition change request that causes the rate of repetition at which a pilot signal is transmitted to be set for the first transmission repetition.

In this case, when measurement report above_b that denotes that the received signal strength of an adjacent pilot signal becomes equal to or greater than threshold b_target that is lower than threshold a_target is received, adjacent wireless base station 14 that has transmitted the adjacent pilot signal is set for the first transmission repetition as the repetition at which the pilot signal is transmitted. Thus, before a handover is started up, the rate of transmission repetitions of the pilot signal by the adjacent wireless base station as the handover target becomes high. As a result, before a handover is started up, a call drop can be suppressed from taking place.

Moreover, in this embodiment, wireless communication section 111 receives measurement report below_c that denotes that the received signal strength of a pilot signal becomes equal to or lowers than threshold c_source. When wireless communication section 111 receives measurement report below_c, control section 116 transmits a mode change request to all adjacent wireless base stations 14.

In this case, before the received signal strength of the own pilot signal falls and thereby a call drop takes place, the rates of transmission repetitions of pilot signals by all adjacent wireless base stations 14 become high. Thus, before a handover is started up, a call drop can be suppressed from taking place.

In addition, in this embodiment, when network communication section 114 receives the mode change request, control section 116 sets transmission section 112 for the regular mode as the operation mode and starts up the timer. Even if determination section 115 determines that no mobile terminal is present before the timer times out, control section 116 does not set transmission section 112 for the power save mode.

In this case, before a handover is completed, wireless base station 11 can be prevented from being changed to the power save mode.

In this embodiment, the power save mode may be set, for example, only at a predetermined time zone such as midnight. For example, at midnight, since a few mobile terminals 12 are present in the cell of wireless base station 11, it is supposed that wireless base station 11 is often set for the power save mode. In such a predetermined time zone, control section 116 requests mobile terminal 12 to transmit the measurement report above_a or below_c if the received signal strength of an adjacent pilot signal becomes equal to or greater than threshold b_target or if the received signal strength of an own pilot signal becomes threshold a_target. Thus, if the received signal strength of the adjacent pilot signal becomes equal to or greater than threshold b_target or if the received signal strength of the own pilot signal becomes threshold a_target, mobile terminal 12 transmits measurement report above_a or below_c.

In this case, when the likelihood is low that the operation mode will be changed to the power save mode, since the operation mode has not been changed, the load imposed on wireless base station 11 can be reduced.

Next, a third embodiment will be described. In the following description, sections that have the identical functions as those of the second embodiment will be denoted by the identical reference numerals and their description may be omitted.

Figure 19:
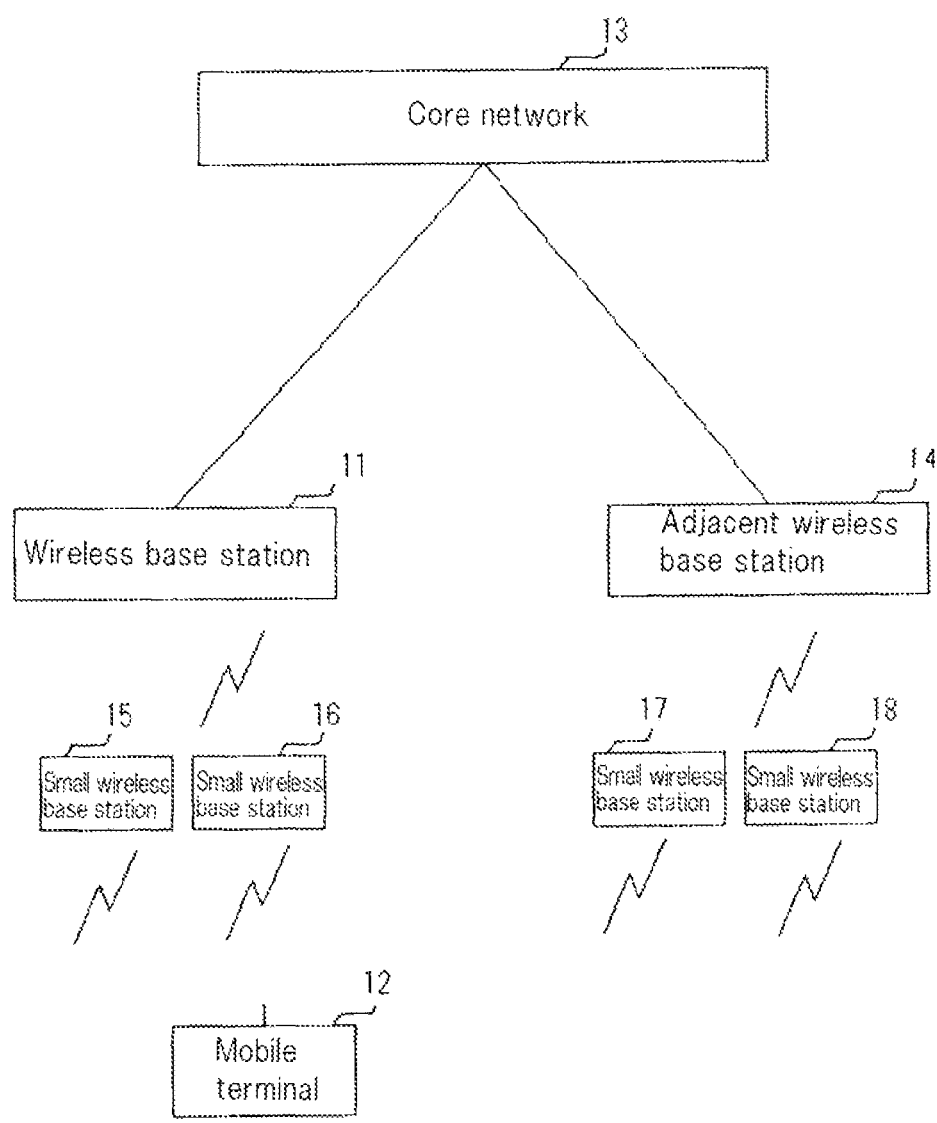
FIG. 19 is a block diagram showing a cellular system according to a third embodiment.

FIG. 19 is a block diagram showing a cellular system according to this embodiment. In FIG. 19, in addition to the structure shown in FIG. 6, the cellular system also includes small wireless base stations 15 to 18. In addition, it is supposed that the cellular system according to this embodiment is an LTE system like the second embodiment.

Small wireless base stations 15 to 18 manage cells that cover very small areas (radii of around several ten meters) called femtocells. Small wireless base stations 15 to 18 may be also called home wireless base stations (home eNode B).

Wireless base station 11 communicates with small wireless base stations 15 and 16 whereas adjacent wireless base station 14 communicates with small wireless base stations 17 and 18.

When small wireless base stations 15 to 18 receive a pilot signal from wireless base station 11 or from adjacent wireless base station 14, small wireless base stations 15 to 18 add femtocell identification information (Physical Cell ID), that identifies a femtocell that is managed by the small wireless base station manages, to the pilot signal. Small wireless base stations 15 to 18 transmit the pilot signal in which the femtocell identification information has been added. Cell identification information that identifies cells that wireless base station 11 and adjacent wireless base station 14 manage is called global cell identification information (Global Cell ID).

Mobile terminal 12 has been allocated a communicable small wireless base station. Storage section 121 of mobile terminal 12 also stores a list of femtocell identification information that identifies femtocells that communicable small wireless base stations manage. In addition, while communicating with a small wireless base station, storage section 121 stores femtocell identification information that identifies a femtocell that the small wireless base station manages as communicating femtocell identification information.

Next, the operation will be described.

Figure 20:
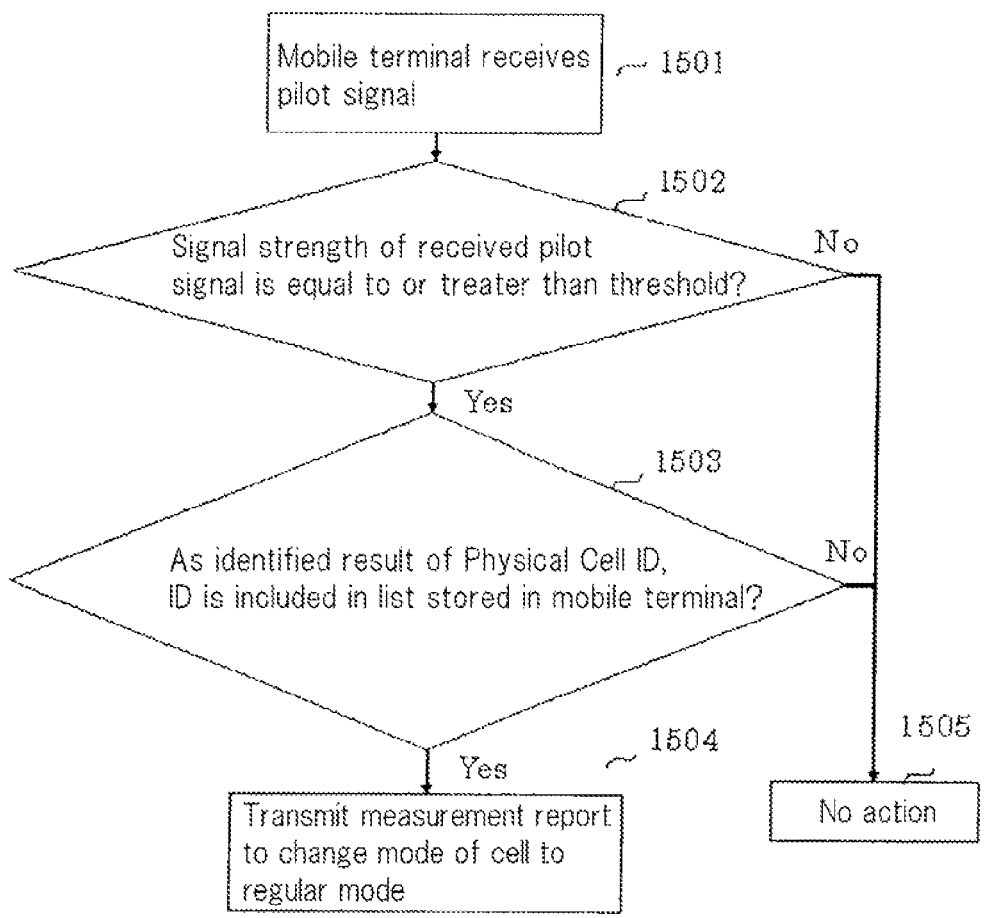
FIG. 20 is a flowchart describing an example of the operation of a mobile terminal according to the third embodiment.

FIG. 20 is a flowchart describing an example of the operation of mobile terminal 12 according to this embodiment. Hereinafter, a case in which mobile terminal 12 receives a pilot signal that a small wireless base station has transmitted as an adjacent pilot signal will be described.

When terminal communication section 122 of mobile terminal 12 receives a pilot signal (at step 1501), terminal communication section 122 transmits the pilot signal to measurement section 123.

When measurement section 123 receives the pilot signal, measurement section 123 determines whether or not global identification information and communicating femtocell identification information in the pilot signal are identical to those stored in storage section 121. Now, since the pilot signal is an adjacent pilot signal, measurement section 123 determines that these pieces of the cell identification information are different and identifies that the pilot signal is an adjacent pilot signal. Thereafter, measurement section 123 determines whether or not the measured received signal strength is equal to or greater than threshold b_target (at step 1502).

If the received signal strength is equal to or greater than threshold b_target (YES at step 1502), measurement section 123 determines whether or not the femtocell identification information is included in the list of femtocell identification information stored in storage section 121 (at step 1503).

If femtocell identification information is included in the list (YES at step 1503), measurement section 123 obtains the global cell identification information from the pilot signal and transmits the global cell identification information and information that denotes that the received signal strength is equal to or greater than threshold b_target to management section 124. When management section 124 receives such information and the global identification information, management section 124 generates measurement report above_b that includes the global identification information. Management section 124 transmits generated measurement report above_b to wireless base station 11 through terminal communication section 122 (at step 1504).

If the received signal strength is lower than threshold b_target (No at step 1502) and the femtocell identification information is not included in the list (No at step 1503), measurement section 123 completes the process (at step 1505).

In this embodiment, even if a small wireless base station is present in the cellular system, before a mobile terminal performs a handover, a call drop can be prevented from taking place.

Next, a fourth embodiment will be described. In the following, functions different from those of the second embodiment will be described.

Figure 21:
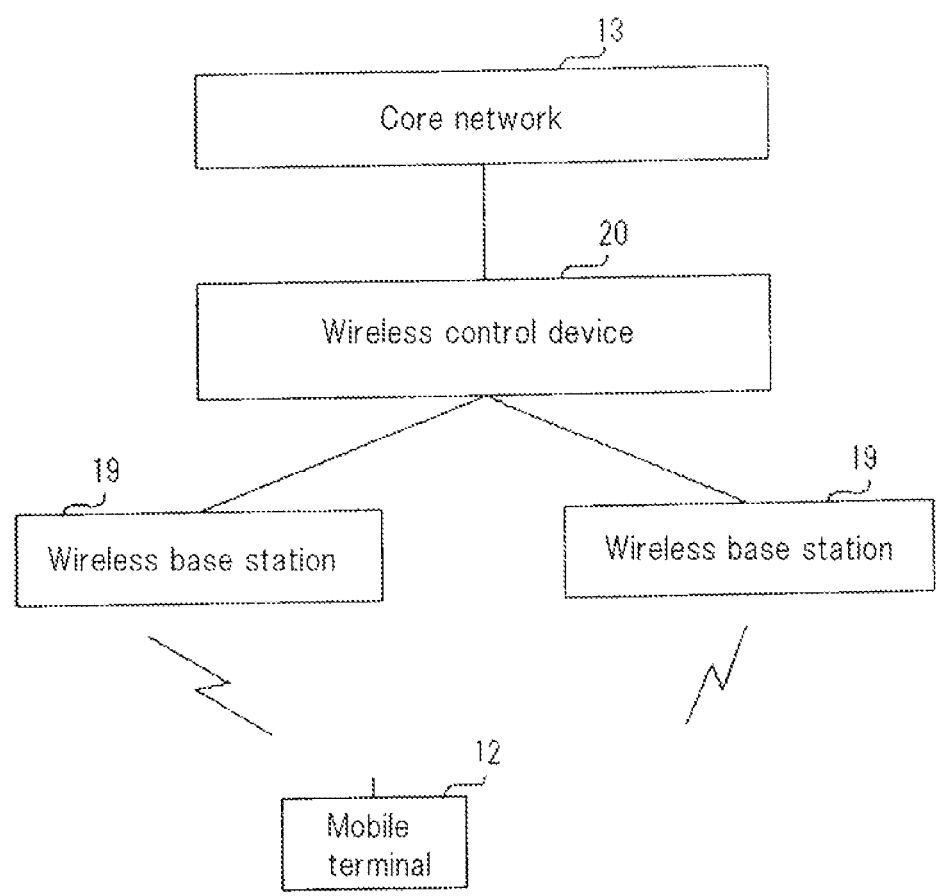
FIG. 21 is a block diagram showing a cellular system according to a fourth embodiment.

FIG. 21 is a block diagram showing a cellular system according to this embodiment. In this embodiment, a third generation mobile communication system is applied as the cellular system.

In FIG. 21, the cellular system includes mobile terminal 12, wireless base station 19, and wireless control device (RNC: Radio Network Controller) 20. In FIG. 21, the number of wireless base stations 19 is only two; however, the desired actual number may be any plural number.

Mobile terminal 12 transmits measurement reports above_a and above_b to wireless control device 20 through wireless base station 19 that is communicating.

FIG. 22 is a block diagram showing an example of the structure of wireless control device 20.

Wireless control device 20 includes counter-base-station communication station 211, control device storage section 212, determination section 213, and control section 214. On the other hand, counter-base-station communication station 211, control device storage section 212, determination section 213, and control section 214 compose a base station control module that controls wireless base station 19.

Counter-base-station communication station 211 is an example of a communication means. Counter-base-station communication station 211 receives measurement reports above_a and above_b from mobile terminal 12. In addition, counter-base-station communication station 211 receives a mode change completion report from wireless base station 19.

Control device storage section 212 stores base station information. In the base station information, the addresses of wireless base stations 19 are correlated with individual pieces of cell identification information that subordinate wireless base stations 19 manage.

Determination section 213 determines whether or not a mobile terminal is present in a cell that each of subordinate wireless base stations 19 manage.

Control section 214 controls the transmission repetitions of pilot signals that wireless base stations 19 transmit. Specifically, control section 214 performs the following process.

When counter-base-station communication station 211 receives measurement report above_a, control section 214 causes mobile terminal 12 to perform a handover to wireless base station 19 that manages a cell identified by cell identification information in measurement report above_a.

When counter-base-station communication station 211 receives measurement report above_b, control section 214 transmits a mode change request to subordinate wireless base stations 19.

FIG. 23 is a descriptive diagram showing an example of the mode change request. In FIG. 23, mode change request 1601 includes moving target wireless base station address 1602, moving target cell ID 1603, wireless control device address 1604, and mode change request information 1605.

Moving target wireless base station address 1602 is base station identification information that identifies a moving target wireless base station. Moving target cell ID 1603 is cell identification information that identifies a moving target cell. Wireless control device address 1604 is control device identification information that identifies a wireless control device. Mode change request information 1605 denotes that this information (mode change request) is a mode change request.

The description will be returned to FIG. 22. When wireless base stations 19 and 20 receive a mode change request, they change the operation mode to the regular mode and transmit a mode change completion report to wireless control device 20.

FIG. 24 is a descriptive diagram showing an example of the mode change completion report. In FIG. 24, mode change completion report 1701 includes wireless control device address 1702, moving target wireless base station address 1703, moving target cell ID 1704, mode change completion report information 1705, and mode change result information 1706.

Wireless control device address 1702 is control device identification information that identifies the wireless control device. Moving target wireless base station address 1703 is base station identification information that identifies a moving target wireless base station. Moving target cell ID 1704 is cell identification information that identifies a moving target cell. Mode change completion report information 1705 denotes that this information (mode change completion report) is a mode change completion report. Mode change result information 1706 denotes whether or not the operation mode has been successfully changed.

The description will be returned to FIG. 22. When counter-base-station communication station 211 receives the mode change completion report, control section 214 completes the process that sets wireless base stations 19 for the operation mode.

In addition, if determination section 213 determines that a mobile terminal is present, control section 214 sets subordinate wireless base stations 19 for the regular mode. In addition, if determination section 115 determines that no mobile terminal is present, control section 214 sets subordinate wireless base stations 19 for the power save mode.

Next, the operation will be described.

Figure 25:
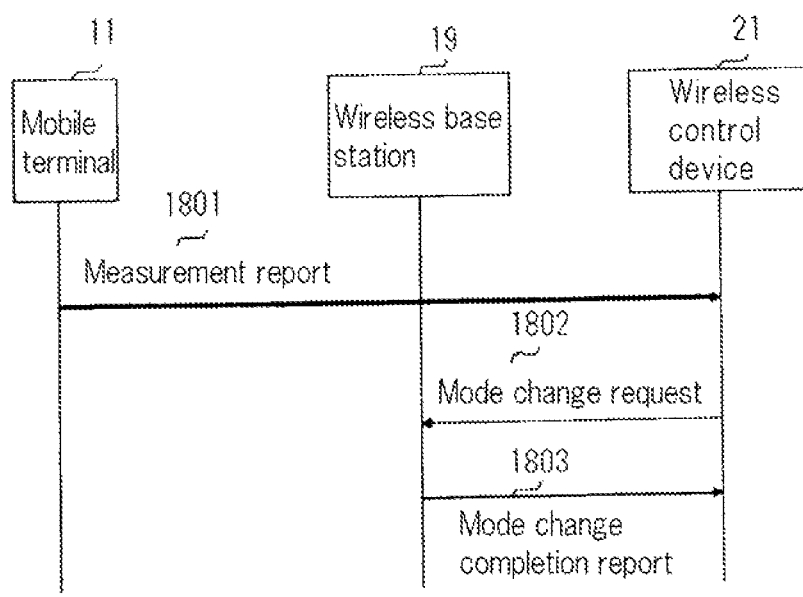
FIG. 25 is a sequence diagram describing the operation of the wireless control device in the state in which it receives measurement report above_b.

FIG. 25 is a sequence diagram describing the operation of wireless control device 20 in the state in which it receives measurement report above_b.

When counter-base-station communication station 211 of wireless control device 20 receives measurement report above_b, counter-base-station communication station 211 transmits measurement report above_b to control section 214 (at step 1801).

When control section 214 receives measurement report above_b, control section 214 obtains base station information and its own control device address from control device storage section 212. Control section 214 generates mode change requests including cell identification information, the address corresponding thereto, and its own control device address based on each piece of cell identification information in the base station information. Control section 214 transmits the individual mode change requests to individual wireless base stations 19 (at step 1802).

When each of wireless base stations 19 receives the mode change request, they sets their own base stations for the regular mode. For example, if a wireless base station has been set for the power save mode, the wireless base station changes the power save mode to the regular mode; if the wireless base station has been set for the regular mode, the wireless base station does not change the operation mode, but keeps the regular mode.

Thereafter, wireless base station 19 generates a mode change completion report and transmits the mode completion report to wireless control device 20. When counter-base-station communication station 211 of wireless control device 20 receives the mode change completion report, counter-base-station communication station 211 transmits the mode change completion report to control section 214. When control section 214 receives the mode change completion report, control section 214 completes the process (at step 1803).

Figure 26:
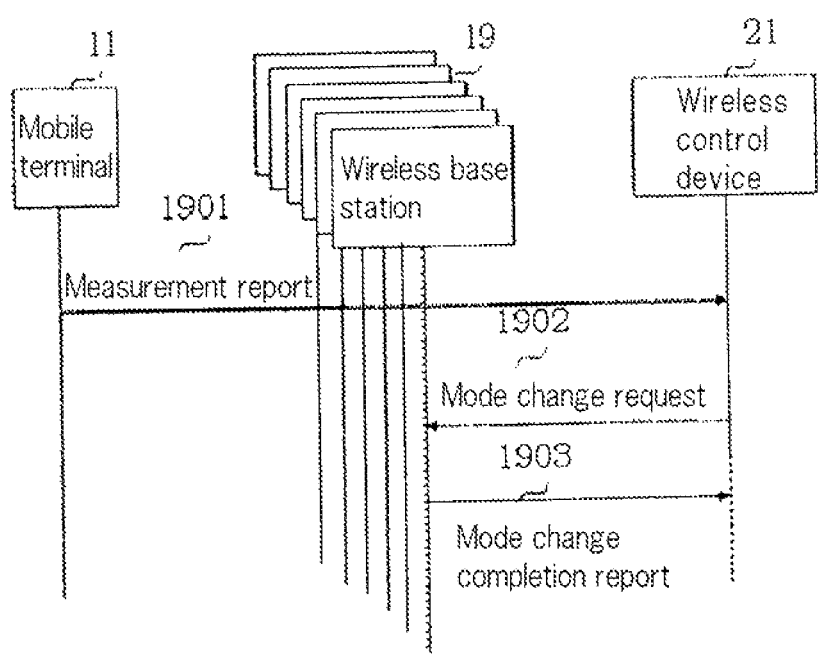
FIG. 26 is a sequence diagram describing an example of the operation of the wireless control device and the wireless base station in the state in which the wireless control device receives measurement report below_c.

FIG. 26 is a sequence diagram describing the operation of wireless control device 20 in the state in which it receives measurement report below_c.

When counter-base-station communication station 211 of wireless control device 20 receives measurement report below_c, counter-base-station communication station 211 transmits measurement report below_c to control section 214 (at step 1901).

When control section 214 receives measurement report below_c, control section 214 obtains base station information of the adjacent base stations of the cell and its own control device address from control device storage section 212. Control section 214 generates mode change requests including cell identification information, the address corresponding thereto, and an own control device address based on each piece of cell identification information of the adjacent base station information of the adjacent base station. Control section 214 transmits the individual mode change requests to individual wireless base stations 19 (at step 1902).

When each of wireless base stations 19 receives the mode change request, they set the own base stations for the regular mode. For example, if a wireless base station has been set for the regular mode, the wireless base station changes the power save mode to the regular mode; if the wireless base station has been set for the regular mode, the wireless base station does not change the operation mode, but keeps the regular mode.

Thereafter, wireless base station 19 generates a mode change completion report and transmit it to wireless control device 20. When counter-base-station communication station 211 of wireless control device 20 receives the mode change completion report, counter-base-station communication station 211 transmits the mode change completion report to control section 214. When control section 214 receives the mode change completion report, control section 214 completes the process (at step 1903).

Figure 27:
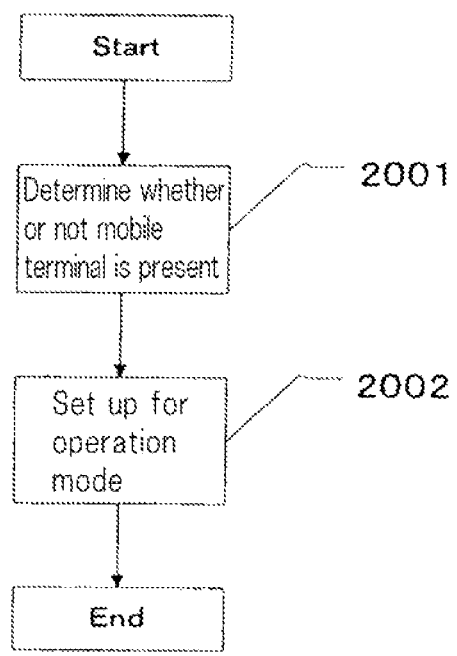
FIG. 27 is a flowchart describing an example of the operation of the wireless control device in the state in which it changes the operation mode depending on whether or not a mobile terminal is present.

Next, the operation of wireless control device 20 that changes the operation mode depending on whether or not a mobile terminal is present will be described. FIG. 27 is a flowchart describing an example of the operation.

Determination section 213 periodically determines whether or not a mobile terminal is present in a cell that each of wireless base stations 19 manages (at step 2001).

Thereafter, determination section 213 transmits an internal report that represents the determined result to control section 214. Control section 214 receives the internal report. If the internal report denotes that a mobile terminal is present, control section 214 sets wireless base station 19 to which a mobile terminal belongs for the regular mode. In contrast, if the internal report denotes that there is no mobile terminal that belongs to all of wireless base stations 19, control section 214 sets all of wireless base stations 19 for the power save mode (at step 2002).

Specifically, if control section 214 sets the regular mode, control section 214 transmits respective mode change requests to subordinate wireless base stations 19.

In contrast, if control section 214 sets the power save mode, control section 214 transmits respective power save change requests that cause the power save mode to be set as the operation mode to subordinate wireless base stations 19. The save power change request is what mode change request information 1605 in the mode change request shown in FIG. 23 is substituted with information that represents the power save change request.

When wireless base station 19 receives the power save change request, wireless base station 19 sets for the power save mode as the operation mode and transmits a power save change completion report, that denotes that the operation mode corresponding to the power save change request has been set, to wireless control device 1502. The power save change completion report is for example information identical to the mode change request shown in FIG. 24.

According to this embodiment, even if a third generation mobile communication system is applied as a cellular system, both the suppression of the power consumption of a wireless base station and the reduction of the period that a mobile terminal takes to identify a cell can be satisfied at a time. In addition, before a handover is started, a call drop can be prevented from taking place.

Each device described in each of the embodiments has many functions not described above. However, they are well known by those in the art. In addition, since they do not directly relate to the present invention, their detailed description is omitted.

Now, with reference to the embodiments, the present invention has been described. However, it should be understood by those skilled in the art that the structure and details of the present invention may be changed in various ways without departing from the scope of the present invention.

What is claimed is:

1. A base station control module that controls a wireless base station that transmits its own cell pilot signal, comprising:
    a determination section that periodically determines whether or not a mobile terminal is present in an own cell that said wireless base station manages;
    a control section that sets said wireless base station for a first transmission repetition as a transmission repetition at which said own cell pilot signal is transmitted by said wireless base station if said determination section determines that said mobile terminal is present and that sets said wireless base station for a second transmission repetition that is lower than said first transmission repetition as said transmission repetition if said determination section determines that said mobile terminal is not present; and
    a communication section that receives from a mobile terminal that is present in said own cell a first measurement report that denotes that a received signal strength of an adjacent pilot signal that an adjacent wireless base station that adjoins said wireless base station transmits becomes equal to or greater than a predetermined first threshold and a second measurement report that denotes that the received signal strength of said adjacent pilot signal becomes equal to or greater than a second threshold that is lower than said first threshold,
    wherein said control section performs a handover of said mobile terminal to a relevant adjacent wireless base station if said communication section receives said first measurement report and transmits to said adjacent wireless base station a repetition change request that causes a repetition at which said adjacent pilot signal is transmitted to be set for said first transmission repetition if said communication section receives said second measurement report.

2. The base station control module as set forth in claim 1, wherein said communication section receives, from said mobile terminal that is present in said own cell, a third measurement report that denotes that said own cell pilot signal becomes equal to or lower than a predetermined third threshold,
    wherein said control section transmits, to all of said adjacent wireless base stations, a repetition change request that causes a repetition, at which said adjacent pilot signal is transmitted, to be set for said first transmission repetition if said communication section receives said third measurement report.

3. The base station control module as set forth in claim 1, wherein said communication section receives from a mobile terminal that is present in said own cell a third measurement report that denotes that said own cell pilot signal becomes equal to or lower than a predetermined third threshold, and
    wherein said control section transmits said repetition change request to all of said adjacent wireless base stations if said communication section receives said third measurement report.

4. The base station control module as set forth in claim 1, wherein said communication section receives said repetition change request; and
    wherein said control section sets for said transmission repetition as a first transmission repetition and starts up a timer if said communication section receives said repetition change request, and does not set said wireless base station for said second transmission repetition even if said determination section determines that said mobile terminal is not present before said timer times out.

5. A wireless base station, comprising:
    a base station control module as set forth in claim 1; and
    a transmission section that transmits said own cell pilot signal at a transmission repetition that has been set by said control section.

6. A wireless base station control device comprising:
    a base station control module as set forth in claim 1.

7. A base station control method that controls a wireless base station that transmits an own cell pilot signal, comprising:
    periodically determining whether or not a mobile terminal is present in an own cell that said wireless base station manages;
    setting said wireless base station for a first transmission repetition as a transmission repetition at which said own cell pilot signal is transmitted by said wireless base station if determined that said mobile terminal is present and setting said wireless base station for a second transmission repetition that is lower than said first transmission repetition as said transmission repetition if it is determined that said mobile terminal is not present;
    receiving from a mobile terminal that is present in said own cell a first measurement report that denotes that a received signal strength of an adjacent pilot signal that an adjacent wireless base station that adjoins said wireless base station transmits becomes equal to or greater than a predetermined first threshold and a second measurement report that denotes that the received signal strength of said adjacent pilot signal becomes equal to or greater than a second threshold that is lower than said first threshold;

performing a handover of said mobile terminal to a relevant adjacent wireless base station if said first measurement report is received; and transmitting to said adjacent wireless base station a repetition change request that causes a repetition, at which said adjacent pilot signal is transmitted, to be set for said first transmission repetition if said second measurement report is received.

8. The base station control method as set forth in claim 7, further comprising:

receiving, from said mobile terminal that is present in said own cell, a third measurement report that denotes that said own cell pilot signal becomes equal to or lower than a predetermined third threshold; and transmitting, to all of said adjacent wireless base stations, a repetition change request that causes a repetition, at which said adjacent pilot signal is transmitted, to be set for said first transmission repetition if said third measurement report is received.

* * * * *